US008427722B2

(12) United States Patent
Alessi et al.

(10) Patent No.: US 8,427,722 B2
(45) Date of Patent: Apr. 23, 2013

(54) COLOR TRANSFORM INSENSITIVE TO PROCESS VARIABILITY

(75) Inventors: Paula J. Alessi, Rochester, NY (US); John R. D'Errico, Alton, NY (US); Gustav J. Braun, Fairport, NY (US); Donald M. Reiman, Caledonia, NY (US); David W. Bishop, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 505 days.

(21) Appl. No.: 12/793,924

(22) Filed: Jun. 4, 2010

(65) Prior Publication Data

US 2011/0299143 A1 Dec. 8, 2011

(51) Int. Cl.
*G03F 3/08* (2006.01)
*H04N 1/60* (2006.01)
*G06K 9/00* (2006.01)

(52) U.S. Cl.
USPC ............ 358/523; 358/1.9; 358/529; 382/167

(58) Field of Classification Search .................. 358/1.9, 358/518, 523, 530, 504, 529, 520, 534; 382/167, 382/162, 166
See application file for complete search history.

(56) References Cited

U.S. PATENT DOCUMENTS

| | | | |
|---|---|---|---|
| 4,482,917 A | 11/1984 | Gaulke et al. | |
| 5,305,119 A | 4/1994 | Rolleston et al. | |
| 5,402,253 A | 3/1995 | Seki | |
| 5,528,386 A | 6/1996 | Rolleston et al. | |
| 5,539,540 A * | 7/1996 | Spaulding et al. | 358/518 |
| 5,553,199 A * | 9/1996 | Spaulding et al. | 358/1.9 |
| 5,857,063 A | 1/1999 | Poe et al. | |
| 5,999,703 A * | 12/1999 | Schwartz et al. | 358/1.9 |
| 6,205,246 B1 * | 3/2001 | Usami | 382/167 |
| 6,377,366 B1 * | 4/2002 | Usami | 358/520 |
| 6,744,534 B1 * | 6/2004 | Balasubramanian et al. | 358/1.9 |
| 6,956,967 B2 * | 10/2005 | Gindele et al. | 382/167 |
| 7,058,234 B2 * | 6/2006 | Gindele et al. | 382/274 |
| 7,079,281 B1 * | 7/2006 | Ng et al. | 358/1.9 |
| 7,120,295 B2 * | 10/2006 | Edge et al. | 382/162 |
| 7,236,263 B2 | 6/2007 | Okuyama | |
| 7,259,893 B2 | 8/2007 | Falk et al. | |
| 7,365,879 B2 | 4/2008 | Braun et al. | |
| 7,535,596 B2 * | 5/2009 | Spaulding et al. | 358/1.9 |

(Continued)

OTHER PUBLICATIONS

P. Hung, "Colorimetric calibration in electronic imaging devices using a look-up table model and interpolations," Journal of Electronic Imaging, vol. 2(1), pp. 53-61 (1993). Acquired from Infosource.

*Primary Examiner* — Madelein A Nguyen
(74) *Attorney, Agent, or Firm* — Kevin E. Spaulding

(57) ABSTRACT

A method for determining a blended color transform for use in producing printed colors on a color printer having at least four device color channels, comprising: forming first and second color transforms, wherein the first color transform produces printed colors that have a reduced sensitivity to color printer process variations in at least a first region of color space that includes a near-neutral color region, and wherein the second color transform produces printed colors that have a reduced image noise visibility in at least a second region of color space; defining a blending function which computes weighting values for the first and second color transforms as a function of input color values; and using a processor to determine the blended color transform by blending the first color transform and the second color transform, responsive to the blending function.

24 Claims, 27 Drawing Sheets

U.S. PATENT DOCUMENTS

| | | | |
|---|---|---|---|
| 7,548,343 B2 * | 6/2009 | Ng et al. | 358/1.9 |
| 7,573,611 B2 | 8/2009 | Derhak et al. | |
| 7,629,983 B2 * | 12/2009 | Edge | 345/603 |
| 8,085,435 B2 * | 12/2011 | Hauf et al. | 358/1.9 |
| 8,203,756 B2 * | 6/2012 | Edge | 358/1.9 |
| 2003/0025924 A1 | 2/2003 | Lammens et al. | |
| 2004/0071363 A1 * | 4/2004 | Kouri et al. | 382/276 |
| 2004/0119992 A1 * | 6/2004 | Falk et al. | 358/1.9 |
| 2005/0152597 A1 * | 7/2005 | Spaulding et al. | 382/162 |
| 2006/0250624 A1 * | 11/2006 | Spaulding et al. | 358/1.9 |
| 2007/0097461 A1 * | 5/2007 | Ng et al. | 358/504 |
| 2009/0296107 A1 | 12/2009 | Mestha et al. | |
| 2009/0296153 A1 | 12/2009 | Wang et al. | |

* cited by examiner ized scanned by a scanner. Similarly, the complement function can be used to determine RGB color values from input CMY color values

COLOR TRANSFORM INSENSITIVE TO PROCESS VARIABILITY

FIELD OF THE INVENTION

This invention pertains to the field of digital color printing, and more particularly to a method for building a color transform having a reduced sensitivity to color printer process variations.

BACKGROUND OF THE INVENTION

The normal human visual system is trichromatic in nature, meaning that visual color can be described mathematically as a three-dimensional space. A number of different three-dimensional color spaces have been used to represent visual color. Most notable are the well-known color spaces defined by the Commission Internationale de l'Eclairage (CIE), such as CIE XYZ, CIELAB (L*a*b*), and CIELUV (L*u*v*). In these color spaces, a point represents a color that is visually distinct from those represented by other points in that space. They are often referred to as device-independent color spaces since they can be used to represent visual color independent of what device may have been used to create the color. Device-independent color values are generally determined by measuring the spectral content of an image sample using a spectrophotometer, and then performing a series of required calculations associated with the definition of the color space. Alternatively, device-independent color values can be measured directly with a measuring device such as a colorimeter.

Color imaging devices are used to display or print digital image content for many applications ranging from softcopy computer displays, to desktop printers for personal computers, to high-volume graphic arts printing presses. A corollary of the trichromatic nature of color vision is that the satisfactory reproduction of colors requires the use of at least 3 independent colorants. Most softcopy display devices make use of three additive color primaries, typically red, green and blue (abbreviated as RGB). Most hardcopy color printing devices make use of at least three chromatic colorants, typically cyan, magenta and yellow (abbreviated as CMY). In addition, color printing devices may use an achromatic, or black colorant (abbreviated as K). In some cases, light colorants, such as light cyan and light magenta, or additional chromatic colorants, such as red, blue, green or orange may also be used.

For color imaging devices that use three colorants, there will generally be a unique one-to-one relationship between the device colorant control values (e.g., RGB code values), and the resulting device-independent color values (e.g., L*a*b*) produced by the device. In many applications, it will be desirable to determine what device colorant control values are needed to produce a desired set of device-independent color values. This can be done by building a model to represent this one-to-one relationship.

FIG. 1 illustrates a prior art method for producing a desired color on a three-channel RGB color imaging device. First, a forward device model 12 is formed relating the RGB device code values 10 to corresponding device-independent color values 14 in a color space such as L*a*b*. Such forward device models 12 can sometimes be determined by modeling the physics of the color imaging device, for example accounting for the phosphor colors and nonlinear response of a softcopy display system. In other cases, forward device models 12 can be determined empirically by printing (or displaying) patches with known RGB device code values 10, and measuring the resulting device-independent color values 14. A mathematical model can then be determined by fitting the measured data. The mathematical model can be a parametric model, or can take other forms such as a three-dimensional look-up table (LUT) storing device-independent color values 14 for a lattice of RGB device code values 10.

A build three-channel inverse device model step 16 is then used to determine an inverse device model 18 from the forward device model 12. The inverse device model 18 can be used to determine the RGB device code values 10 necessary to produce a desired set of device-independent color values 14. Since there is generally a one-to-one relationship between the RGB device code values 10 and the device-independent color values 14, there will be a unique inverse transform for all colors within the color gamut of the color imaging device. (The term color gamut refers to the range of colors that can be produced on a given color imaging device.) In some cases, it may be possible to mathematically invert the forward device model depending on its functional form. In other cases, interpolation methods or iterative techniques can be used to determine the inverse device model. For example, see the article "Colorimetric calibration in electronic imaging devices using a look-up table model and interpolations" by P. Hung (Journal of Electronic Imaging, Vol. 2(1), pp. 53-61, 1993).

Inverse device models 18 are commonly used by color management systems, where they are often referred to as "output device profiles." Often an output device profile for a particular output device is combined with a forward device model for a particular input device (commonly referred to as an "input device profile") to form a color-managed color transform that can be used to transform the input device code values to the corresponding device code values that will produce the same device-independent color values on the output device.

FIG. 2 illustrates an analogous method for producing a desired color on a 4-channel CMYK color printing device. First, a forward device model 22 is formed relating CMYK device code values 20 to corresponding device-independent color values 24 in a color space such as L*a*b*. A build 4-channel inverse device model step 26 is then used to determine an inverse device model 28 from the forward device model 22. The inverse device model 28 can be used to determine the CMYK device code values 20 necessary to produce a desired set of device-independent color values 24.

While the methods shown in FIG. 1 and FIG. 2 appear to be quite similar, the problem of determining an inverse device model is actually significantly more complicated for color imaging devices using four or more colorants, such as devices that utilize CMYK colorants. Since the colorant control value space in a CMYK system has a higher number of dimensions (4) than device-independent color spaces (3), there is typically no unique way to reproduce a given visual color. Generally, there will an infinite number of CMYK combinations that can be used to produce a given device-independent color. The resulting ambiguity has to be resolved by imposing additional constraints in order to determine the CMYK values that should be used to produce a desired device-independent color.

Historically, simple mathematical equations have been used to convert scanner RGB values to CMYK values for offset printing presses for use in the graphic arts industry. For example, a simple complement function can be used to determine CMY color values from input RGB color values $C = 1 - R$ $M = 1 - G$ $Y = 1 - B$ Subsequently, a K color value is generated in order to add black to the CMY overprints. In the simplest case, the K color value can be determined as a function of the minimum of the CMY color values (for example, see U.S. Pat. No. 4,482,917). When black is added to an overprint, the CMY color values should generally be reduced accordingly, in order to keep the color from being darkened.

Various strategies have been developed in the printing industry for using more or less black in printing various colors, and for adjusting the amounts of the chromatic colorants. These techniques are sometimes referred to as Under Color Removal (UCR), Grey Component Replacement (GCR) or Under Color Addition (UCA) methods. Unfortunately, these terms have been used differently by different writers and have lost the precise meaning they once may have had. Most of these earlier methods do not automatically preserve color fidelity to a high degree of accuracy because the conversion of RGB to CMY and the conversion of CMY to CMYK are not based on accurate colorimetric models of the color reproduction process.

A number of methods have been proposed to address the need of determining colorimetrically accurate inverse device models for CMYK color printing devices. In U.S. Pat. No. 5,402,253, Van de Capelle et al. disclose a method where K is treated as an extra dimension that must be assigned a specific value by imposing an additional constraint or relation that becomes a condition imposed on an iterative search for an inverse.

In U.S. Pat. Nos. 5,305,119 and 5,528,386, Rolleston et al. similarly impose a relation between K and CMY. However, their method establishes the form of this relation prior to the colorimetric characterization. The model is defined over a three-dimensional space, and the 4-dimensional ambiguity is avoided from the beginning. Color patches are printed and measured with the imposed relation, resulting in a three dimensional model that can be inverted.

In U.S. Pat. No. 5,553,199, Spaulding et. al disclose a method for producing inverse device models which involves creating data structures that can be used to determine minimum and maximum black levels using conventional three-dimensional inverse interpolation. A K value can then be determined using a functional relationship, and another conventional three-dimensional inverse interpolation can then be used to find the appropriate CMY values.

In U.S. Pat. No. 5,857,063, Poe et al. disclose a method for controlling the color of a multi-colorant printing system that includes defining a transform from a three-dimensional parameter space to the colorant control space. The basic method that they employed is summarized in the flowchart given in FIG. 3. A color mapping function 31 (referred to as S(c,m,y)) is defined which specifies a mapping from a three-channel parameter space with cmy parameter space code values 30 to CMYK device code values 32. The color mapping function 31 controls the usage of K relative to the usage of CMY, and is specified by a series of functional relationships with various control parameters. The color mapping function 31 can be combined with a forward device model 33 (referred to as R(C,M,Y,K)) to form a composite transform 35 (referred to as T(c,m,y)). The composite transform 35 can be used to transform from the cmy parameter space code values 30 to corresponding device-independent color values 34 in a color space such as L*a*b*. Since the composite transform 35 has three input dimensions and three output dimensions, it can be directly inverted using a build inverse composite transform step 36 to form an inverse composite transform 37, which can be used to transform from device-independent color values 34 back to corresponding cmy parameter space code values 30.

FIG. 4 illustrates how this inverse composite transform 37 can be combined with the color mapping function 31 to form an inverse device model 38. (The same part numbers are used here as were used in FIG. 3 to refer to the identical elements.) The resulting inverse device model 38 can then be used to determine the CMYK device code values 32 that will produce a desired set of device-independent color values 34. The inverse device model 38 is the key result which is required to form a color management output profile, or a color transform from a known input device to the color printing device.

As mentioned above, the color mapping function 31 plays the important role of controlling the usage of K relative to the usage of CMY throughout the color gamut of the printer. The functional relationships disclosed by Poe et al. provide many degrees of freedom to control this relationship. However, they do not provide any mechanism for flexibly and independently controlling this relationship for different parts of color space in order to enable making tradeoffs between color gamut, image noise (i.e., unwanted spatial variations in the image, sometime referred to as "graininess"), ink usage, etc. differently as a function of color. Additionally, there is no means for conveniently using this method to control CMYK process variability.

U.S. Pat. No. 7,535,596 to Spaulding et al., entitled "Colorant control values for color printing devices," discloses a method for building color transforms which includes independently defining color mappings for a set of paths through color space. An interpolation technique is used to determine color mappings for the rest of the color space. This enables more flexibility to control the colorant usage in different parts of color space. However, only a limited degree of control is possible due to the fact that the color mappings are only explicitly defined along the neutral axis and along paths at the edges of the color gamut.

For systems that accept CMYK input data from any arbitrary source, it is desirable to smoothly blend that arbitrary CMYK data into a CMYK printing system that has been well-characterized with an output profile. U.S. Pat. No. 7,259,893 to Falk et al., entitled "Methods and apparatus for gray component replacement blending" teaches a means for blending GCR estimates from the arbitrary CMYK data with GCR estimates from CMYK values resulting from the output profile for a known printer. Both GCR estimates are made after converting the device dependent CMYK data to the device-independent CIELAB data and using L* data to approximate GCR levels. The estimated GCR levels for the arbitrary CMYK color and for the CMYK color from the output profile are determined by such blending techniques as linear or non-linear combinations of the GCR estimates, or they may be derived empirically. The CMY levels get adjusted to assure that the intended CIELAB values are achieved.

U.S. Patent Application Publication 2009/0296107 to Mestha et al., entitled "Method, apparatus and systems to retrieve GCRs from historical database," teaches building a color profile from a GCR profile selected from a database of multiple GCR profiles based on predefined criteria to produce desired image quality. This retrieval of historical GCR data and subsequent GCR profile selection ensures similar color rendering, especially with regard to black ink usage on the same printer at different times or a different printer model of the same type.

U.S. Pat. No. 7,573,611 to Derhak et al., entitled "Gamut maximizing black generation for printers", teaches a black generation strategy using independently controllable chromatic and achromatic curves, each including a CMY color space curve and a black curve. Input parameters such as black start, maximum black value, and curve type to control the rate of black ink addition are used to generate the chromatic and achromatic curves. This method maximizes the gamut of the device by providing richer dark region colors while allowing separate control of black ink addition in the chromatic and achromatic regions of color space.

In general, there are a variety of different design criteria that can be considered when determining the usage of K relative to the usage of CMY. For example transforms that use more CMY colorants and less K colorant tend to produce images with lower degrees of image noise visibility (i.e., "graininess") because black ink dots are generally more visible than cyan, magenta or yellow ink dots. The image noise visibility concern is particularly important in certain regions of color space such as skin tones and blue skies, where observers tend to be quite sensitive to image noise. Therefore, many methods for building color transforms are designed to minimize the black ink usage, particularly in highlight and skin tone regions of color space. For example, U.S. Patent 2003/0025924 to Lammens et al., entitled "All-device-space automatic black replacement," teaches replacement of pure black ink with cyan, magenta and yellow inks in mid-tone and highlight color regions in order to reduce image noise visibility and mask banding artifacts.

U.S. Pat. No. 7,236,263 to Okuyama et al., entitled "Image processing system and method for improved color conversion" teaches a system and method for converting scanner RGB data to CMY data and then to pixel-based CMYK data based on whether the pixel is in a black color region or a non-black color region. For all pixels that fall in a non-black color region, the K value is altered based on a weighting coefficient determined from the CMY values. For skin tones, the weighting coefficient is very low meaning that very little black ink gets laid down and amounts of cyan, magenta and yellow ink laid down are reduced from initial estimates based on the small amount of black that is used to produce each skin tone pixel.

One disadvantage of color transforms that use more CMY colorants and less K colorant is that they tend to be more sensitive to producing objectionable color variations as a result of printer process variations. For example, if the yellow color channel is printing too dark or too light, this can introduce objectionable color balance shifts which can cause the image to look too yellow or too blue. Such color shifts are generally much more objectionable than an overall shift in image density that can result when the density of a K color channel is too dark or too light. Color balance shifts are particularly objectionable for near-neutral colors. Therefore, neutrals that are formed using only CMY and no K will be very susceptible to objectionable color variations as the printing process varies.

FIG. 5 illustrates an L*-b* plot showing a calibrated neutral scale curve 100 corresponding to a neutral scale produced with equal CMY values for a well-calibrated printer. It can be seen that the b* values remain very close to 0 throughout the L* range. Uncalibrated neutral scale curves 102 and 104 show similar plots that result when the yellow color channel is out of calibration and is producing less yellow or more yellow, respectively, than it was intended to produce. The resulting color cast is quite significant, and would be objectionable for most observers.

One way to overcome the problem of objectionable color variations resulting from color printer variations is to introduce a printer calibration process for the imaging system. The printer calibration process will allow a color printer to produce aim neutral scales reliably over time for a particular printer, and across printers of the same model. Implementation of a printer calibration process that involves a manual measurement process is typically time-consuming and frustrating for a user. Furthermore, the quality of the results is often dependent on the care and skill of the user. Some printers have incorporated in-line measurement instruments to provide automatic calibration in order to enable a high degree of consistency without any user intervention. However, such automatic calibration systems tend to be impractical for many devices due to the cost of the additional components.

Furthermore, neutral colors produced using primarily cyan, magenta and yellow inks tend to be spectrally selective. This means that spectral reflectance is not constant as a function of wavelength. As a result, transforms that feature high CMY ink usage with low black ink usage cannot achieve color constancy for prints viewed under various sources of illumination. Color inconstancy problems tend to be most objectionable for near-neutral colors. Printer color calibration can not do anything to solve color inconstancy problems since they are not caused by variations in the colorant amounts.

One way to address the problems of color variations due to printer process variability and color inconstancy is to utilize color transforms that use lower CMY colorant levels and higher K colorant levels. Such color transforms have the additional advantage that they use a smaller total amount of colorant, thereby reducing materials costs. However, these color transforms suffer from a higher level of image noise visibility due to the increased black ink usage.

Some prior art printing systems have provided different color transforms that can be selected, either manually or automatically, to provide the preferred results based on image content. For example, a color transform featuring a high black ink usage can be provided for use with gray scale images which are particularly susceptible to printer process variability and color inconstancy artifacts. A color transform with a GCR strategy using lower levels of black ink can be provided for use with color images where image noise visibility is often a more critical requirement. However, the use of multiple color transforms based on image content is often considered to be impractical because it typically requires a more complex user interface and requires additional memory for storage of multiple color transforms.

There remains a need for a method to produce color transforms having a reduced sensitivity to color printer process variations for near-neutral colors while simultaneously having a reduced image noise visibility in other regions of color space, such as skin tones, where image noise can be particularly objectionable.

SUMMARY OF THE INVENTION

The present invention represents a method for determining a blended color transform for use in producing printed colors on a color printer having at least four device color channels, wherein the blended color transform transforms colors from an input color space to an output color space, comprising:

forming a first color transform from the input color space to the output color space;

forming a second color transform from the input color space to the output color space, wherein the first color transform produces printed colors that have a reduced sensitivity to color printer process variations relative to the second color transform in at least a first region of color space that includes a near-neutral color region, and wherein the second color transform produces printed colors that have a reduced image noise visibility relative to the first color transform in at least a second region of color space;

defining a blending function which computes weighting values for the first and second color transforms as a function of input color values in the input color space, wherein the weighting values for first color transform are larger than the weighting values for the second color transform in the first region of color space, and wherein the weighting values for second color transform are larger than the weighting values for the first color transform in the second region of color space; and using a processor to determine the blended color transform by blending the first color transform and the second color transform, responsive to the blending function.

This invention has the advantage that it provides a convenient method to apply different image quality constraints in different regions of color space.

It has the additional advantage that it can be used to determine color transforms which have reduced sensitivity to color printer process variations for near-neutral colors while simultaneously having reduced noise visibility for skin tones and other colors where users are particularly sensitive to noise artifacts.

It has a further advantage that it provides a method that is easily extensible for use with other colorant sets besides cyan, magenta, yellow and black.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image", as used herein, refers to any type of digital image, such as a digital still image or a digital video image.

Figure 6:
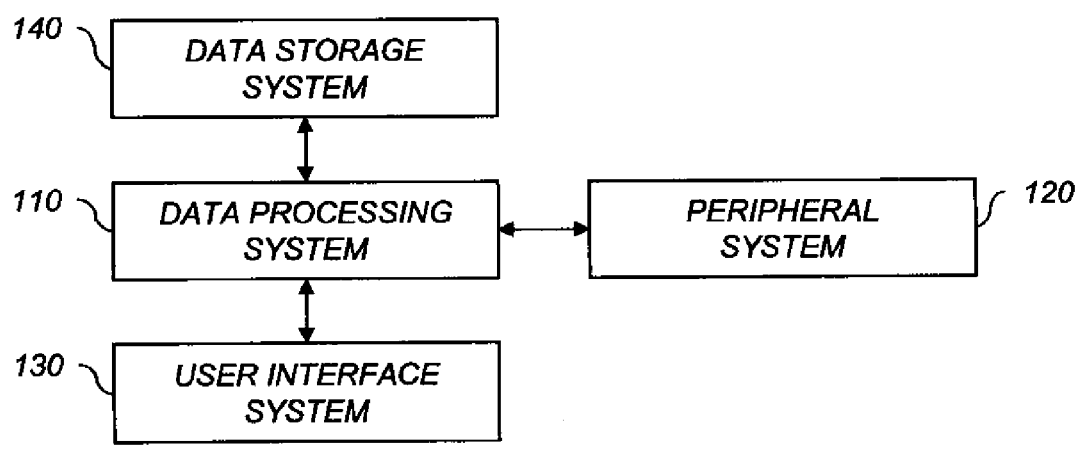
FIG. 6 is a high-level diagram showing the components of a system for determining blended color transforms according to an embodiment of the present invention.

FIG. 6 is a high-level diagram showing the components of a system for determining and using blended color transforms according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 6.

The present invention will now be described with reference to FIG. 7, which shows a flow chart of a method for determining a blended color transform 259 for use in producing printed colors on a color printer having at least four device color channels according to a preferred embodiment of the present invention. In the context of the present invention, color printers include any type of color printing device used to print hard-copy color images. Examples of color printers would include ink jet printers, electrophotographic printers, thermal dye transfer printers and printing presses. It will be understood by one skilled in the art that the present invention is also applicable for other types of color output devices that produce colors using four or more colorants (e.g., soft-copy displays that use red, green, blue and white pixels).

The blended color transform 259 transforms colors from an input color space to an output color space. As will be described in more detail later, in one embodiment of the present invention, the input color space is a three-channel parameter space (cmy), and the output color space is a CMYK device code value space associated with the color printer, such as the color mapping function (S) described with reference to FIG. 3.

A first color transform 252 is formed using a form first color transform step 251, responsive to a printer variability constraint 250. The printer variability constraint 250 imposes characteristics onto the first color transform 252 so that it is robust to color printer process variations, particularly in regions of color space, such as the near-neutral color region, where printer process variations are most objectionable to human observers. In a preferred embodiment, the reduced sensitivity to color printer process variations is characterized by a reduced sensitivity to color balance variations for near-neutral input colors induced by variations in a response characteristic of the color printer. However, other methods can also be used to characterize color printer process variations as will be obvious to those skilled in the art.

A second color transform 255 is formed using a form second color transform step 254, responsive to a printer noise constraint 253. The printer noise constraint 253 imposes characteristics onto the second color transform 255 so that it is robust to image noise visibility, particularly in regions of color space, such as a skin-tone color region, where image noise visibility is most objectionable to human observers.

The first color transform 252 produces printed colors that have a reduced sensitivity to color printer process variations relative to the second color transform 255 in at least a first region of color space that includes the near-neutral color region. The second color transform 255 produces printed colors that have a reduced image noise visibility relative to the first color transform 252 in at least a second region of color space. In a preferred embodiment, the second region of color space includes the skin-tone color region. The second region of color space can also include other color regions where image noise visibility is particularly objectionable, such as a sky blue color region, a saturated color region and a pastel color region. Each of these color regions can be expressed by defining a boundary in color space. For example, a light skin tone region including both Asian and Caucasian skin tones can be defined corresponding to the following ranges: lightness $55<L^*<85$, hue angle: $15°<h_{ab}°<55°$ and chroma: $20<C^*<45$. (Note that darker skin tones will generally require some degree of black ink and could generally not be included within the second region of color space where the usage of black ink is constrained by the printer noise constraint 253.) A saturated color region can be defined corresponding to colors having a chroma exceeding a particular threshold. The saturated color region can include the primary and secondary colors of the input color space. This is consistent with the desire to avoid having black ink used in pure colors such as yellow or cyan.

A define blending function step 256 is used to define a blending function 257. The blending function 257 computes weighting values for the first color transform 252 and the second color transform 255 as a function of input color values in the input color space. The weighting values for first color transform 252 are larger than the weighting values for the second color transform 255 in the first region of color space, and the weighting values for second color transform 255 are larger than the weighting values for the first color transform 252 in the second region of color space.

A blend color transforms step 258 is used to determine the blended color transform 259 by blending the first color transform 252 and the second color transform 255, responsive to the blending function 257. The blended color transform 259 has the characteristic that it will produce output digital images that have a reduced sensitivity to color printer process variations in the first region of color space where observers are most sensitive to color variability, and have a reduced image noise visibility in the second region of color space where observers are most sensitive to image noise visibility. Therefore, the blended color transform 259 will produce output digital images that are preferable to those produced using either the first color transform 252 or the second color transform 255.

Figure 1:
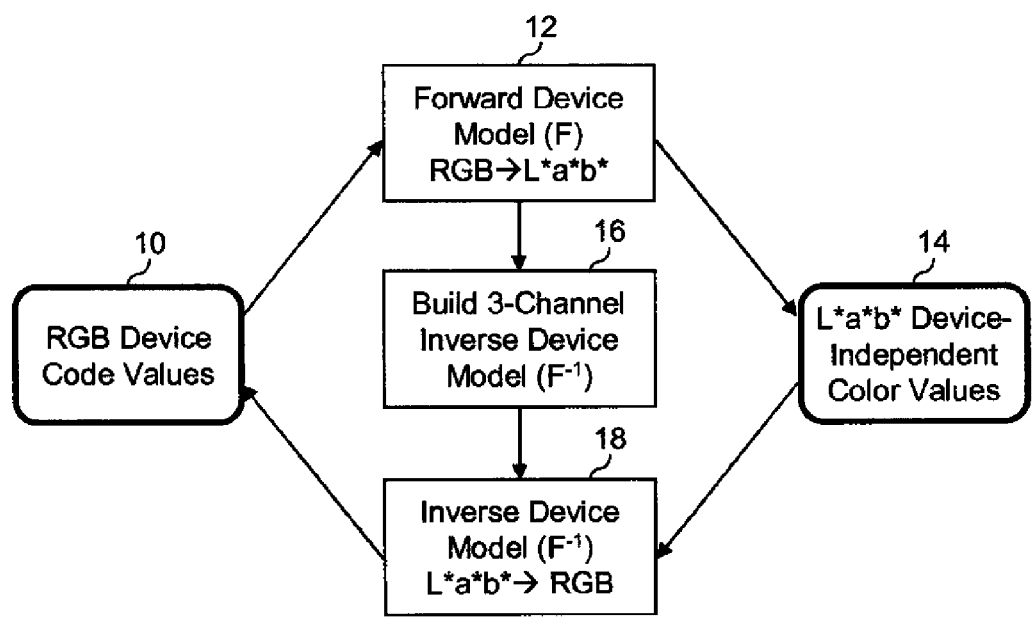
FIG. 1 is a flowchart showing a prior art method for building color transforms for RGB devices.
Figure 2:
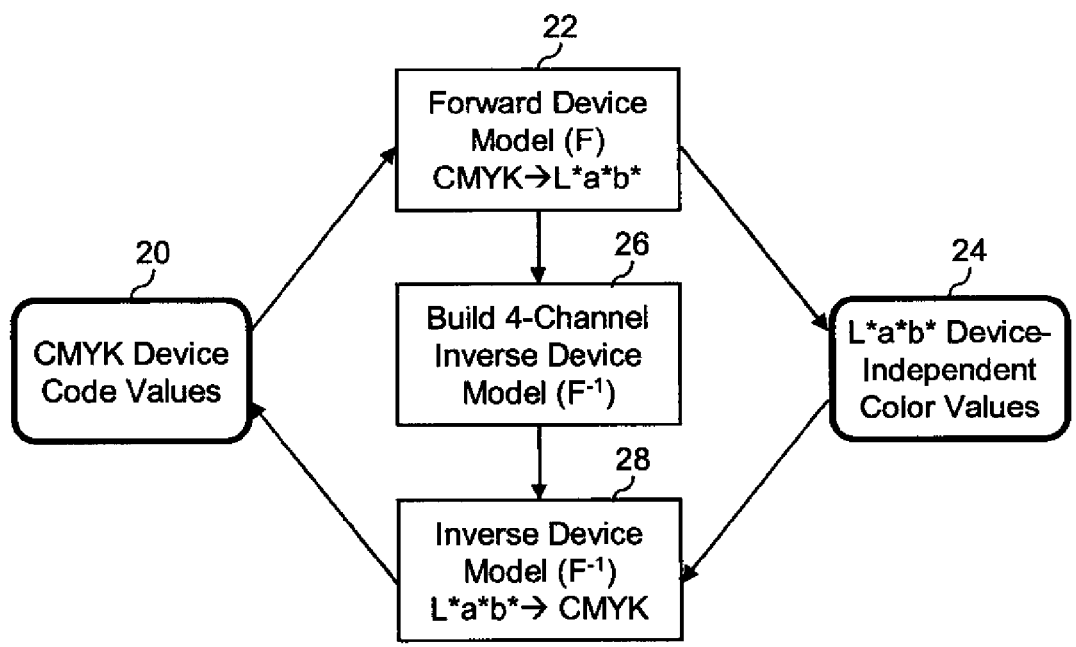
FIG. 2 is a flowchart showing a prior art method for building color transforms for CMYK devices.
Figure 3:
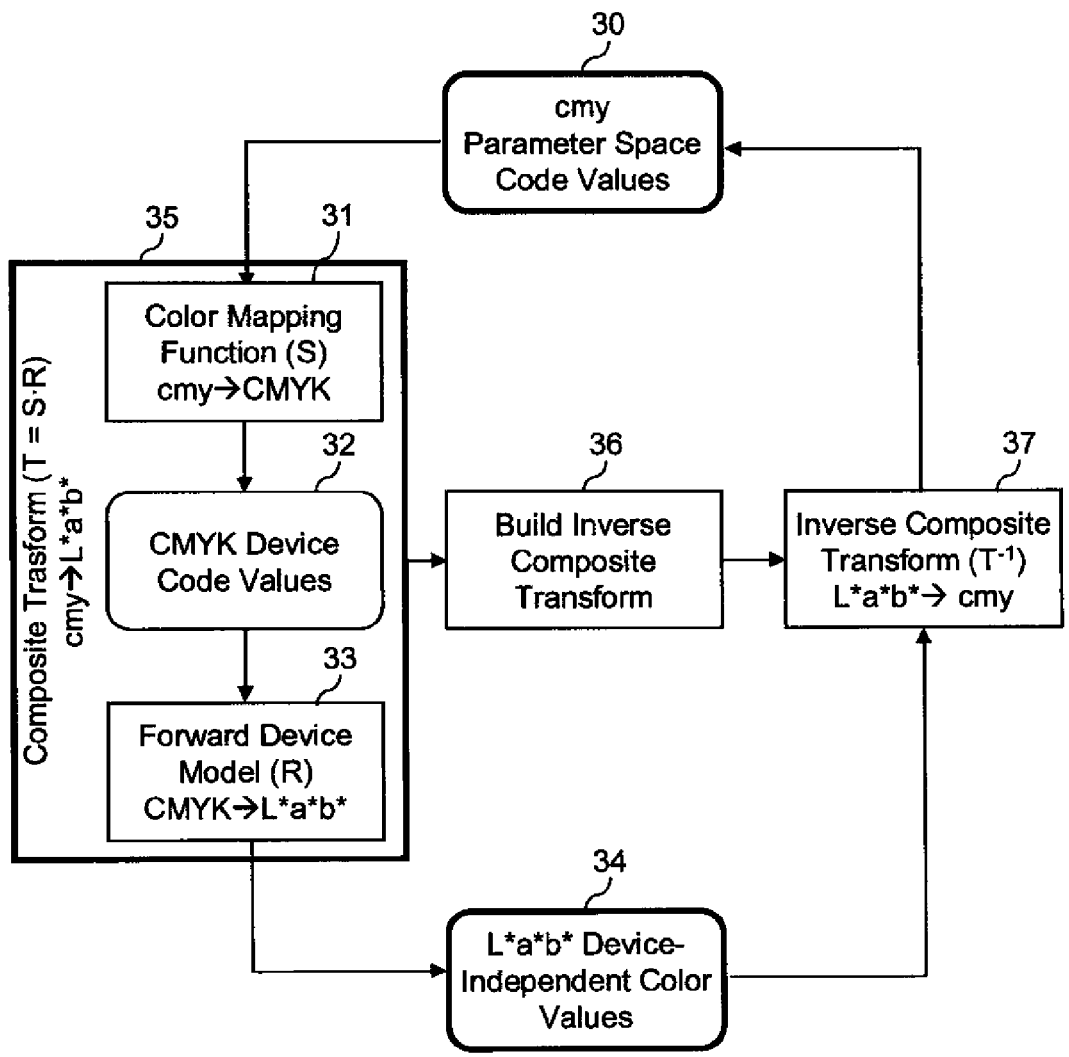
FIG. 3 is flowchart showing another prior art method for building color transforms for CMYK devices.

In one embodiment of the present invention, the blended color transform 259 is a color mapping function (S) of a type which was described with reference to FIG. 3, which maps from a three-channel parameter space (cmy) to a device code value space (CMYK). In this case, the blended color transform 259 is determined by blending between a first color mapping function (first color transform 252) designed according to the printer variability constraint 250, and a second color mapping function (second color transform 255) designed according to the printer noise constraint 253.

In an alternate embodiment, the blended color transform 259 can be formed by blending two inverse device models ($R^{-1}$) which map from the device-independent color space ($L^*a^*b^*$) to the device code value space (CMYK), where the two inverse device models were determined by applying the different constraints.

In other embodiments, the blended color transform 259 can be formed by blending two color managed color transforms which map from an input device color space (e.g., video RGB) to the device code value space (CMYK), where the two inverse device models were determined by applying the different constraints.

The case where the blended color transform 259 is a color mapping function (S) that transforms from a three-channel parameter space (cmy) to a device code value space (CMYK) will now be discussed in more detail. One skilled in the art will understand that the same basic process can be applied to produce other types of blended color transforms 259, such as the alternate embodiments mentioned above.

Figure 8A:
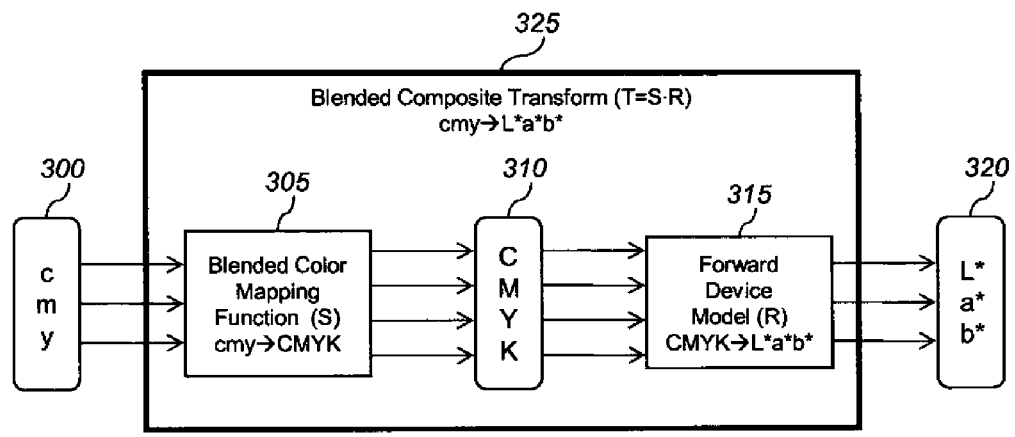
FIG. 8A is a diagram showing the formation of a blended composite transform according to the method of the present invention.

Turning to FIG. 8A, there is given a flow diagram showing how a blended color mapping function 305 determined according to the method of the present invention can be used to process parameter space code values 300 (cmy). The blended color mapping function 305 determines CMYK device code values 310 corresponding to the parameter space code values 300. In some embodiments, the blended color mapping function 305 is specified using a three-dimensional look-up table (3-D LUT). Multi-dimensional interpolation methods, such as tri-linear interpolation or tetrahedral interpolation, can be used to interpolate between the values stored in the 3-D LUT as will be familiar to those skilled in the art.

A forward device model 315 for the color printer can then be used to determine device-independent color values 320 ($L^*a^*b^*$) corresponding to the CMYK device code values 310. The blended color mapping function 305 can be combined with the forward device model 315 to determine a blended composite transform 325 which relates the parameter space code values 300 directly to the corresponding device-independent color values 320.

There are many ways that the blended composite transform 325 can be formed. In one embodiment, a forward device model 315 that relates the CMYK device code values 310 to the corresponding device-independent color values 320 can be combined with the blended color mapping function 305 using well-known color transform combining methods. For example, an input lattice of parameter space code values 300 can be processed through the blended color mapping function 305 to determine corresponding CMYK device code values 310. The resulting CMYK device code values 310 can then be processed through the forward device model 315 to determine corresponding device-independent color values 320. The device-independent color values 320 can be stored in a 3-D LUT having nodes corresponding to the input lattice points.

In another embodiment, a test target is formed having color patches corresponding to a set of specified parameter space code values 300. The parameter space code values 300 for the test patches are mapped through the blended color mapping function 305 to determine corresponding CMYK device code values 310 for the test patches. Device-independent color values 320 are then determined for each of the test patches.

One way to determine the device-independent color values 320 for the test patches is to print a test target with the test patches on the color printer. The resulting test patches are then measured using a color measuring device such as a spectrophotometer or a colorimeter to determine the device-independent color values 320 for each of the test patches. In some embodiments, the device-independent color values 320 are given in terms of the well-known CIELAB color space, although many other device-independent color spaces would also be appropriate for the practice of this invention.

Another means to determine the device-independent color values 320 for the test patches is by modeling the device response for the color printer, and using the printer response model to predict the device-independent color values 320 from the CMYK device code values 310 for each of the test patches. The printer response model can be determined using any modeling technique known to those skilled in the art.

Once the device-independent color values 320 for the test patches have been determined, standard color modeling techniques, such as that described in U.S. Pat. No. 4,941,039 to D'Errico, entitled "Color image reproduction apparatus having a least squares look-up table augmented by smoothing," can be used to determine the blended composite transform 325 from the patch data. The blended composite transform 325 will relate the parameter space code values 300 directly to the corresponding device-independent color values 320.

Figure 8B:
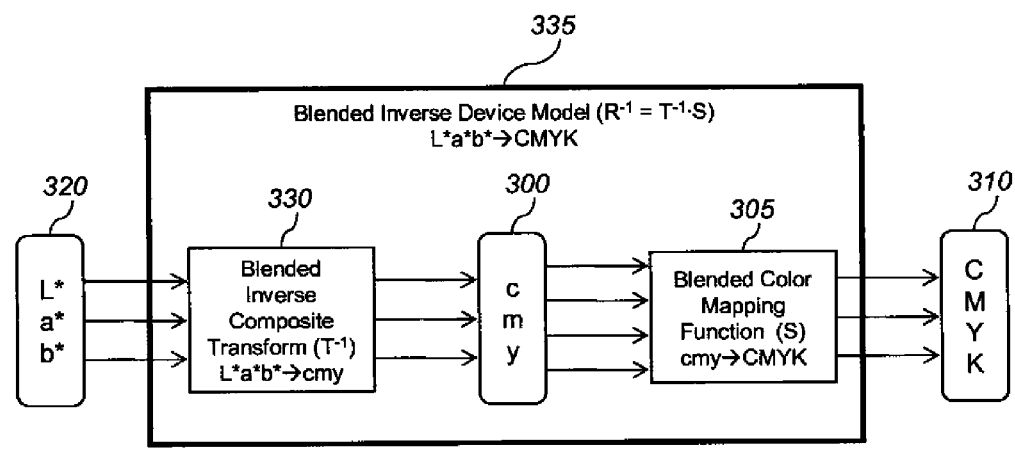
FIG. 8B is a diagram showing the formation of a blended inverse device model according to the method of the present invention.

The blended composite transform 325 has input and output color spaces that each have three-dimensions. Therefore, conventional transform inversion methods that are well-known to those in the art can be used to determine a blended inverse composite transform 330 for converting device-independent color values 320 to corresponding parameter space code values 300 as shown in FIG. 8B. The blended color mapping function 305 can then be used to determine CMYK device code values 310 which can be used to produce the device-independent color values 320 according to the method of the present invention.

In one embodiment of the present invention, an interpolation-based inversion technique is used to determine the blended inverse composite transform 330, such as that described in the aforementioned article by Hung.

It should be noted that the blended inverse composite transform 330 can only be determined for device-independent color values 320 that fall within the color gamut of the color printer. Any device-independent color values 320 that fall outside the color gamut of the color printer, must first be gamut mapped to device-independent color values 320 that fall within (or on the surface of) the color gamut of the color printing device.

There are many different gamut mapping techniques that are well-known to one skilled in the art that could be used for this purpose. For example, one simple gamut mapping technique is to simply clip the chroma value while holding hue and lightness constant, although this generally does not produce optimal results. Another method that provides better results is to find the in-gamut color value that has the minimum $\Delta E^*$ color difference relative to the out-of-gamut color. A variation of the minimum $\Delta E^*$ gamut mapping method that produces good results in many cases is to apply different weights to the hue, lightness and chroma portions of the color error before calculating the color difference.

Once the blended inverse composite transform 330 is determined, it can be combined with the blended color mapping function 305 to form a blended inverse device model 335 that can be used to transform the device-independent color values 320 directly to the corresponding CMYK device code values 310. This can be accomplished using any transform combination method known to those skilled in the art.

Figure 9:
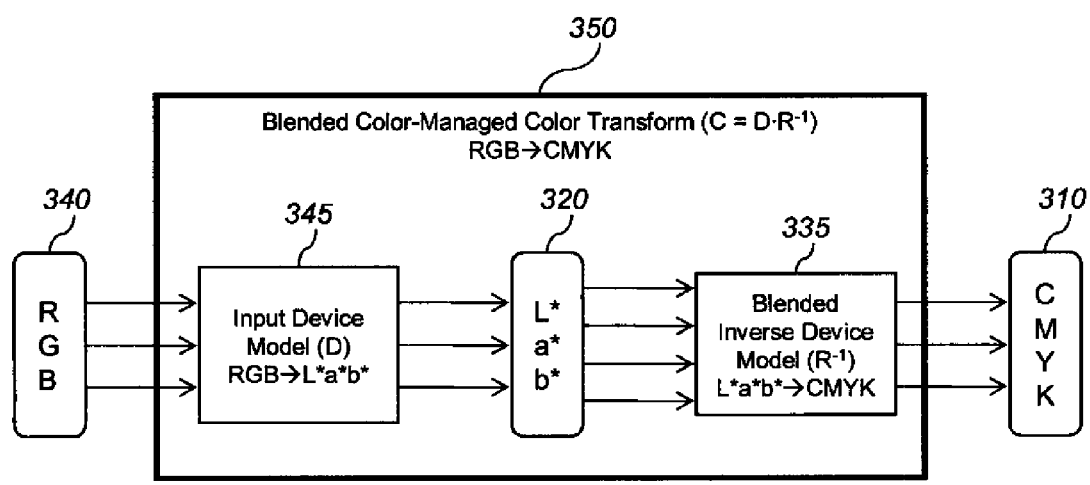
FIG. 9 is a diagram showing the formation of a blended color-managed color transform according to the method of the present invention.

The blended inverse device model 335 can be used to populate an output profile for a color management system such as the well-known ICC color management system. Additionally, as shown in FIG. 9, the blended inverse device model 335 can be used together with an input device model 345 for a particular input device to provide a blended color-managed color transform for converting directly from input device code values 340 for an input device to the corresponding CMYK device code values 310 for the color printer. For example, the input device can be a video RGB device such as a CRT or an LCD display device. The input device model 345 relates the input device code values 340 to the corresponding device-independent color values 320. In some embodiments, the input device model 345 is an sRGB device model corresponding to the standard sRGB color space. The input device model 345 can use a 3-D LUT to represent the color transform, or can use other forms such as a combination of one-dimensional look-up tables (1-D LUTS) and 3×3 matrices. In some embodiments the input device model 345 is stored in the form of a well-known ICC input profile.

The input device model 345 can be combined with the blended inverse device model 335 to form a blended color-managed color transform 350, which can be used to convert directly from the input device code values 340 to corresponding CMYK device code values 310. In some embodiments, the blended color-managed color transform 350 can be stored in a standard ICC device link profile format. In other embodiments, the blended color-managed color transform 350 can be stored in an application-specific color transform format. For example, a color printer can be adapted to print input images in a standard video RGB color space, such as the well-known sRGB color space. The printer can store a blended color-managed color transform 350 that transforms from the sRGB input device code values 340 to the corresponding CMYK device code values 310 in a proprietary 3-D LUT format. The color printer can then use the stored blended color-managed color transform 350 to process input image data in the sRGB color space. The blended color-managed color transform 350 can be applied using a processor inside the printer, or alternately can be applied using printer driver software on a host computer.

Figure 7:
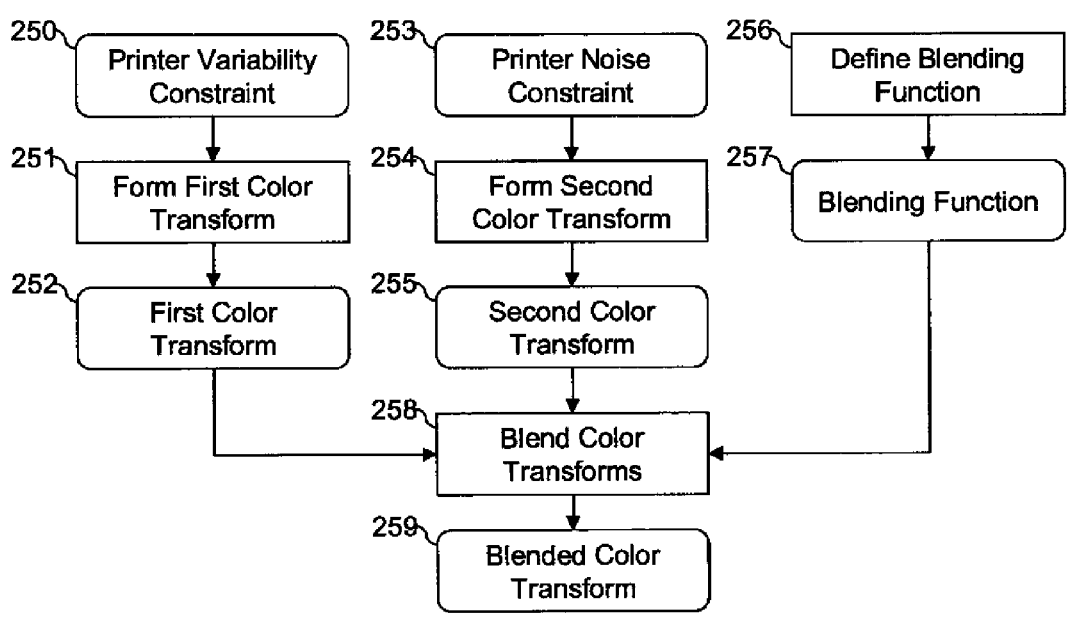
FIG. 7 is a flow chart showing the method of the present invention.

Returning to a discussion of FIG. 7, there are many ways that the first color transform 252 and the second color transform 255 can be determined using the printer variability constraint 250 and the printer noise constraint 253, respectively, in accordance with the present invention. In a preferred embodiment, the method described in U.S. Pat. No. 7,535,596 to Spaulding et al., entitled "Colorant control values for color printing devices," which is incorporated herein by reference, is used to determine the first color transform 252 and the second color transform 255. This method involves defining "path functions" for a set of paths through a three-channel parameter space. The path functions represent color mappings from the three-channel parameter space (e.g., the cmy parameter space) to the device color space for the color printer (e.g., the CMYK color space).

For purposes of illustration, it will be assumed that each of the three channels has an associated parameter space code value that ranges from zero to one. However, it will be recognized by one skilled in the art that other ranges of color space values could also be used such as 0 to 100 or 0 to 255.

Figure 10:
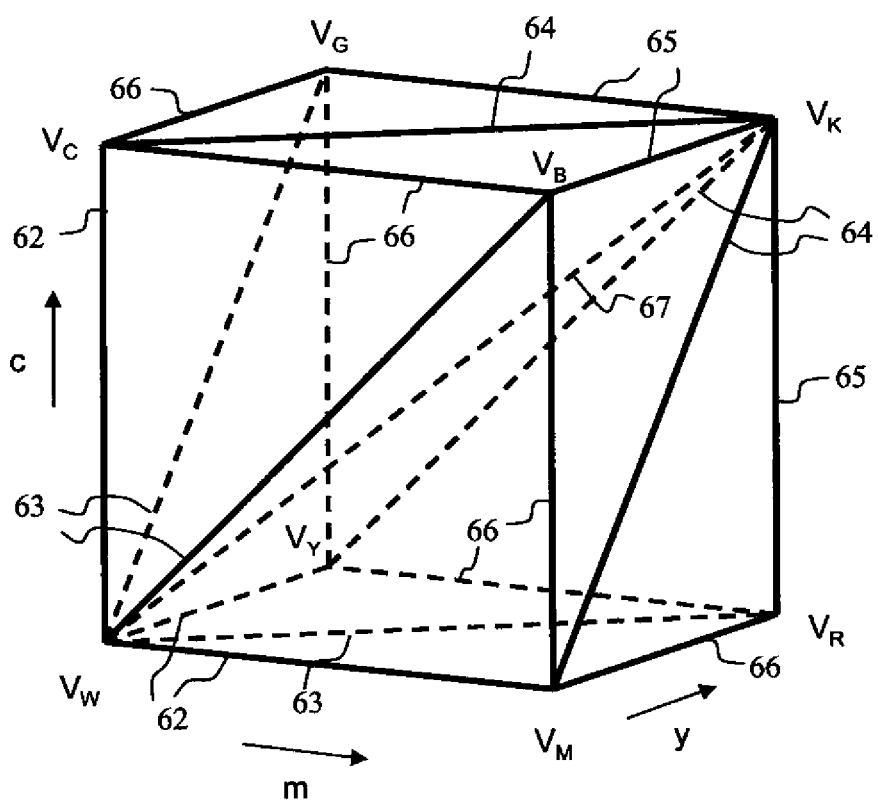
FIG. 10 is a diagram showing a set of paths through a three-channel parameter color space.

The set of color values that can be represented within the three-channel parameter space can be visualized as a color space cube as shown in FIG. 10. The vertex of the color cube where c, m and y are all zero would correspond to a white color, and is labeled as $V_W$. The vertex where c=1, m=0 and y=0 would correspond to the cyan primary, and is labeled as $V_C$. Likewise the vertex labeled as $V_M$ would correspond to the magenta primary, and vertex labeled as $V_Y$ would correspond to the yellow primary. The vertex where c=1, m=1 and y=0 would correspond to a blue secondary color, and is labeled as $V_B$. Similarly, the $V_R$ and $V_G$ vertices correspond to red and green secondary colors, respectively. The vertex where c=1, m=1, and y=1 would correspond to black, and is labeled as $V_K$.

In one embodiment of the present invention, the set of paths is comprised of a set of white-to-primary paths 62 (white-to-cyan, white-to-magenta and white-to-yellow), a set of white-to-secondary paths 63 (white-to-red, white-to-green and white-to-blue), a set of black-to-primary paths 64 (black-to-cyan, black-to-magenta and black-to-yellow), a set of black-to-secondary paths 65 (black-to-red, black-to-green and black-to-blue), a set of primary-to-secondary paths 66, and a neutral axis path 67 connecting the black and white points. However, it will be recognized by one skilled in the art that many other sets of paths could also be used in accordance with the present invention. For example, additional paths could be added connecting the white and black points to points between the primary and secondary colors, or to points in the interior of the color cube. Similarly, not all of the paths listed above need to be included.

Once the path functions specifying the color mappings for the set of paths are defined, a full color mapping function is determined by interpolating between the paths to determine color mappings for all of the parameter space code values. In one embodiment described by Spaulding et al, the interpolating process is performed by breaking the color space cube shown in FIG. 10 into a series of tetrahedra having the defined paths along their edges. To interpolate a particular color mapping for a particular set of parameter space code values, the first step is to determine which tetrahedron contains the particular parameter space code values. Next the identified tetrahedron is sliced using a plane perpendicular to the neutral axis and intersection points between the plane and the edges of the tetrahedron are determined. The color mapping for the particular parameter space code values is then determined by interpolating between the color mappings for the intersection points using a triangular interpolation scheme.

Color transforms with a wide variety of different performance characteristics can be formed by adjusting the form of the path functions that are defined for the various paths. For the purposes of the present invention, one path function of particular importance is the neutral axis path 67 which specifies the colorant usage on the neutral axis. The color mapping specified for the neutral axis path 67 directly controls the reproduction of neutral colors, but also has a significant influence on other important parts of color space as well which are determined by interpolating between the neutral axis path and the other paths.

As noted earlier, the region of color space which is most sensitive to color printer process variations is the near-neutral color region. The near-neutral color region can be defined as the color region where C*<10. Thus, the color mapping for the neutral axis path 67 will have a direct impact on the susceptibility of the color printer to producing objectionable color balance errors that are introduced by color printer process variations. Color mappings that use higher levels of color inks and lower levels of black ink will be much more susceptible to objectionable color printer process variations than color mapping that use low levels of color inks and higher levels of black ink.

The regions of color space where observers are most sensitive to image noise visibility include the skin-tone color region (particularly the light skin-tone color region), as well as the pastel color regions and saturated color regions. The color mappings for these regions will be influenced by both the color mapping for the neutral axis path 67 as well as the color mappings for the other paths along the edges of the color cube (in particular, the white-to-primary paths 62 and the white-to-secondary paths 63). It will usually not be desirable to use any black ink along the white-to-primary paths 62 and the white-to-secondary paths 63. Therefore, it is not possible to adjust the color mapping for these paths in order to trade off between the usage of the color inks and the black inks. As a result, the main knob that can be used to adjust the image noise visibility for the skin-tone color region, the pastel color regions and the saturated color regions will come from the color mapping defined for the neutral axis path 67. Color mappings that use lower levels of color inks and higher levels of black ink for the neutral axis path 67 will be much more susceptible to objectionable image noise visibility artifacts than color mapping that use higher levels of color inks and lower levels of black ink.

In a preferred embodiment of the present invention, the printer variability constraint 250 (FIG. 7) and the printer noise constraint 253 (FIG. 7) are applied by adjusting the color mapping for the neutral axis path while keeping the color mappings for the other paths constant. In alternate embodiments, the color mappings for the other paths can also be adjusted as well.

As described in the aforementioned patent by Spaulding et al., the color mappings for the various paths can be determined by optimizing cost functions. In some embodiments, the printer variability constraint 250 and the printer noise constraint 253 can be applied by including appropriate terms in the cost function, and adjusting the weights of the terms accordingly. In other embodiments, the color mappings can be determined by manually adjusting the black ink usage until the resulting color transform satisfies the appropriate constraints.

FIGS. 11A-G show a set of color mappings for the paths of FIG. 10 corresponding to a first color transform 252 (FIG. 7) which is designed to satisfy the printer variability constraint 250 (FIG. 7). The curves shown in these functions were determined using the method described by Spaulding et al., with the exception of the color mapping for the neutral axis path, which was determined using the additional printer variability constraint 250 associated with the method of the present invention.

Figure 11A:
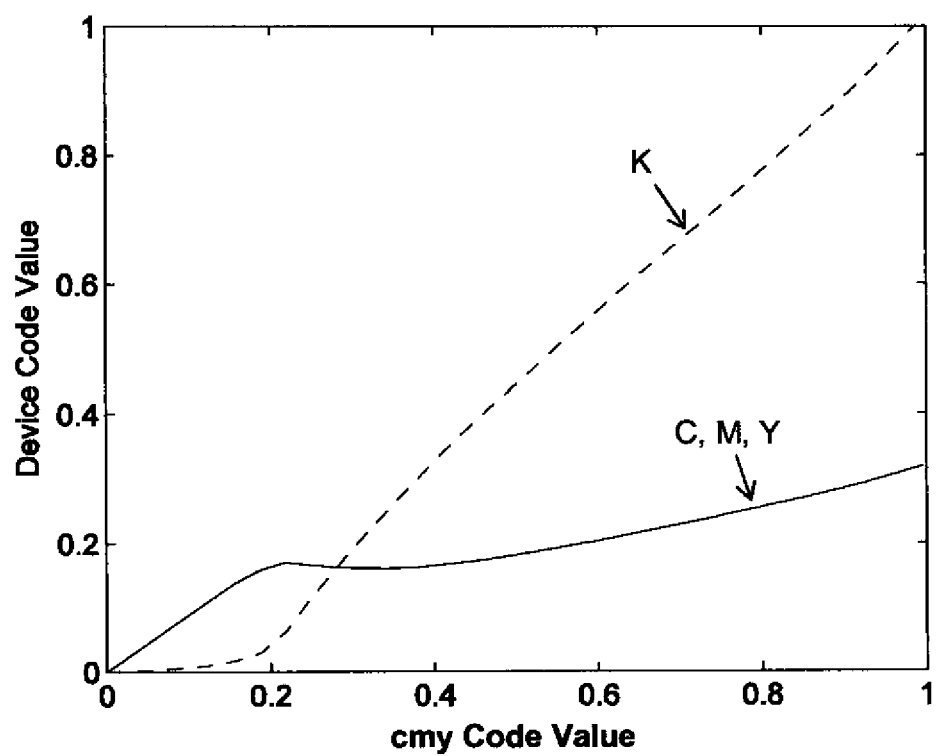
FIG. 11A is a diagram showing an example color mapping function for a neutral axis path determined using a printer variability constraint.

FIG. 11A shows the color mapping for the neutral axis path 67 (FIG. 10) It can be seen that the neutral colors are mapped to printer CMYK code values that generally use much higher levels of black ink (K) than cyan, magenta and yellow inks (C, M, Y). The heavy black ink usage is desirable to reduce the sensitivity of the color transform to color printer process variations. The higher black ink usage along the neutral has the additional advantage that it reduces the sensitivity of the color transform to color inconstancy artifacts where printed colors will change their appearance under different viewing illuminants. Note that some level of cyan, magenta and yellow inks are used throughout most of the neutral axis tone scale. This reflects the fact that small amounts of these inks produce tolerable levels of sensitivity to color printer process variations and color inconstancy artifacts, while reducing the level of noise visibility as much as possible. The balance between these factors is achieved through the cost function and constraints applied during the design of the color mapping for the neutral axis path 67.

Figure 11B:
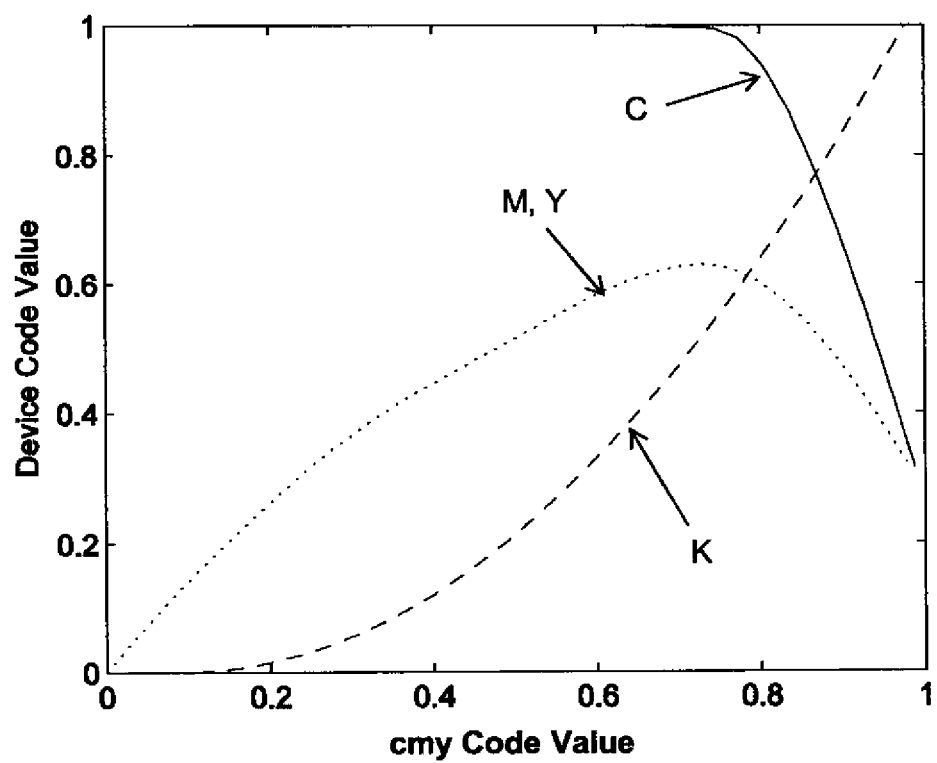
FIG. 11B is a diagram showing an example color mapping function for a black-to-cyan path.
Figure 11C:
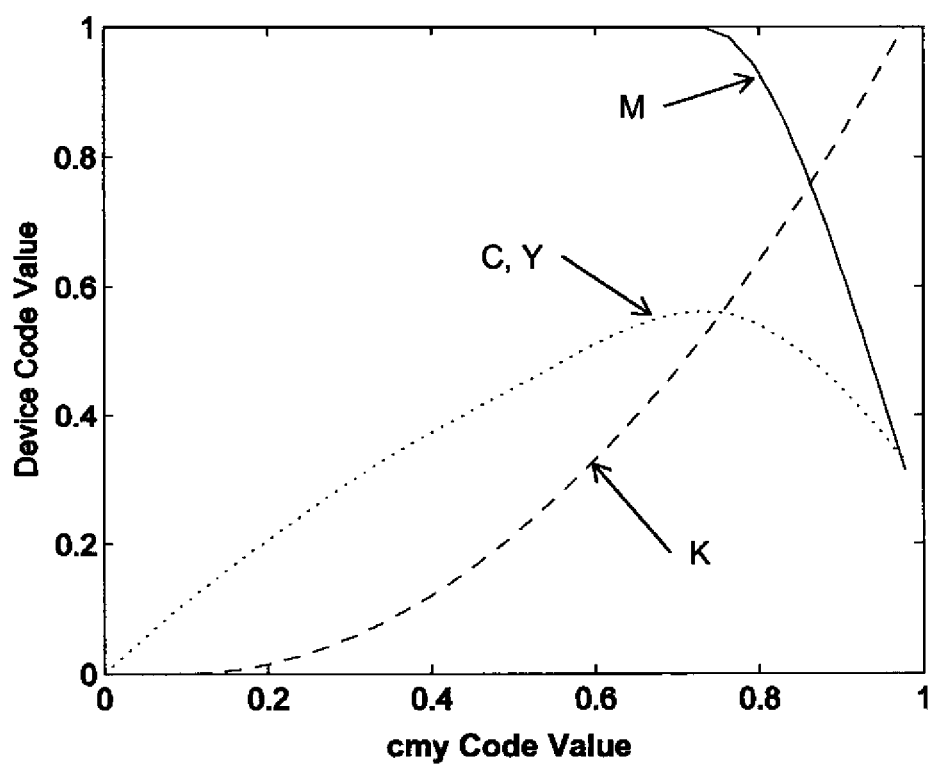
FIG. 11C is a diagram showing an example color mapping function for a black-to-magenta path.
Figure 11D:
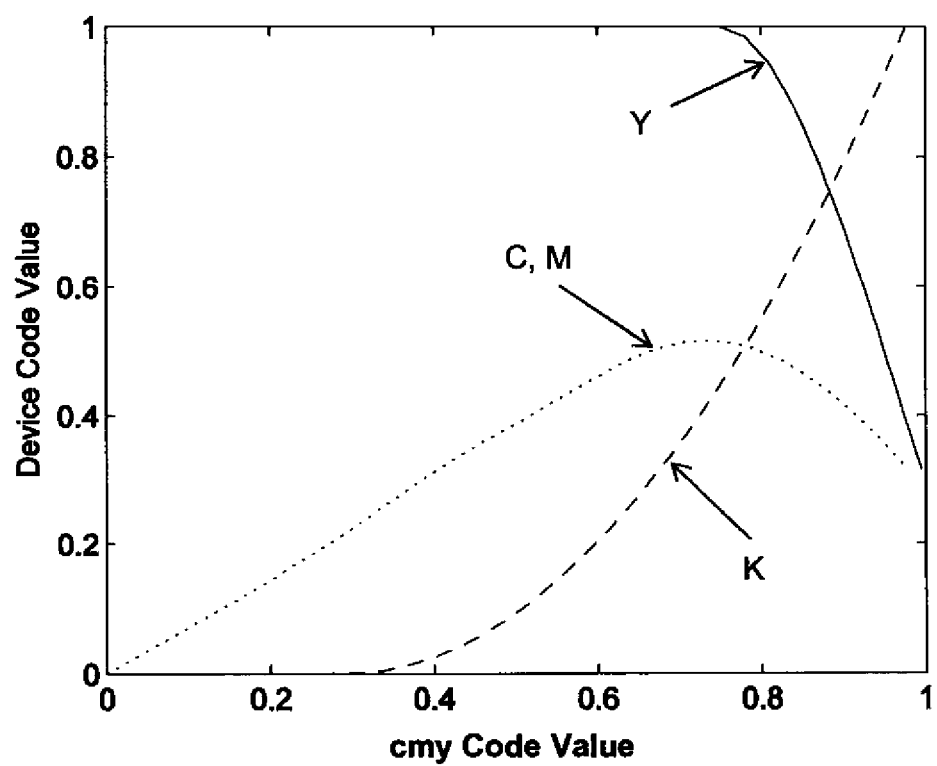
FIG. 11D is a diagram showing an example color mapping function for a black-to-yellow path.

FIGS. 11B-D show color mappings for the black-to-primary paths 64 (FIG. 10). Specifically, FIG. 11B shows a color mapping for the black-to-cyan path, FIG. 11C shows a color mapping for the black-to-magenta path, and FIG. 11D shows a color mapping for the black-to-yellow path. In each case, the left edge of the graph corresponds to the pure primary (cyan, magenta or yellow), and the right edge of the graph corresponds to the black point. The general pattern in proceeding from the primary to the black point is to first add the other colored inks until the ink level nears a maximum fluid limit, then the colored inks are tapered down while increasing the black ink level.

Figure 11E:
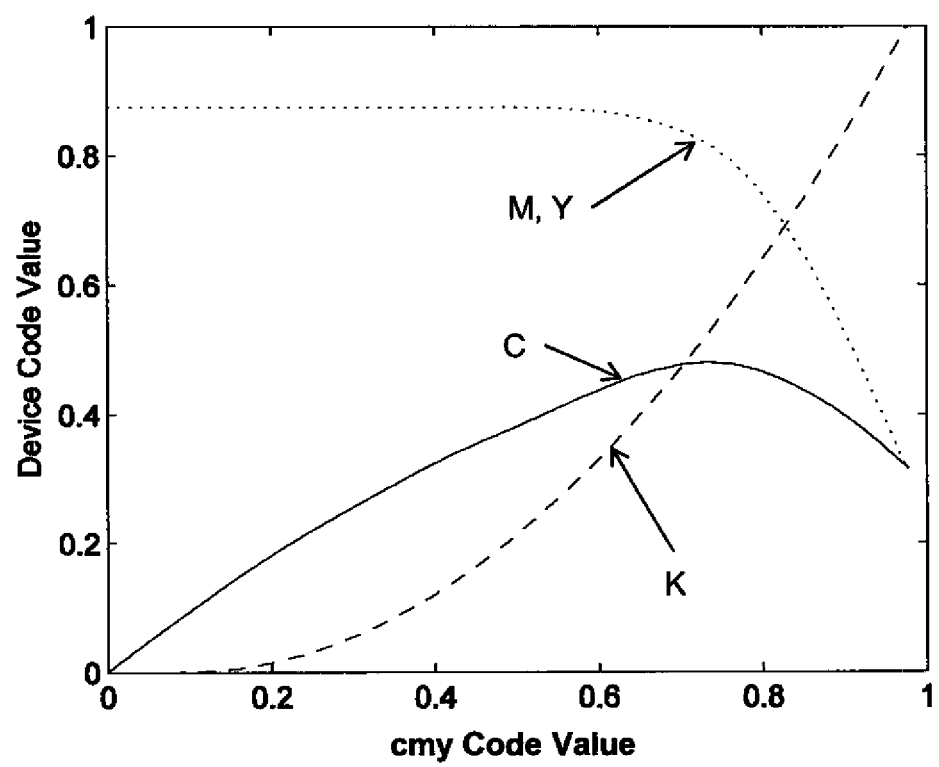
FIG. 11E is a diagram showing an example color mapping function for a black-to-red path.
Figure 11F:
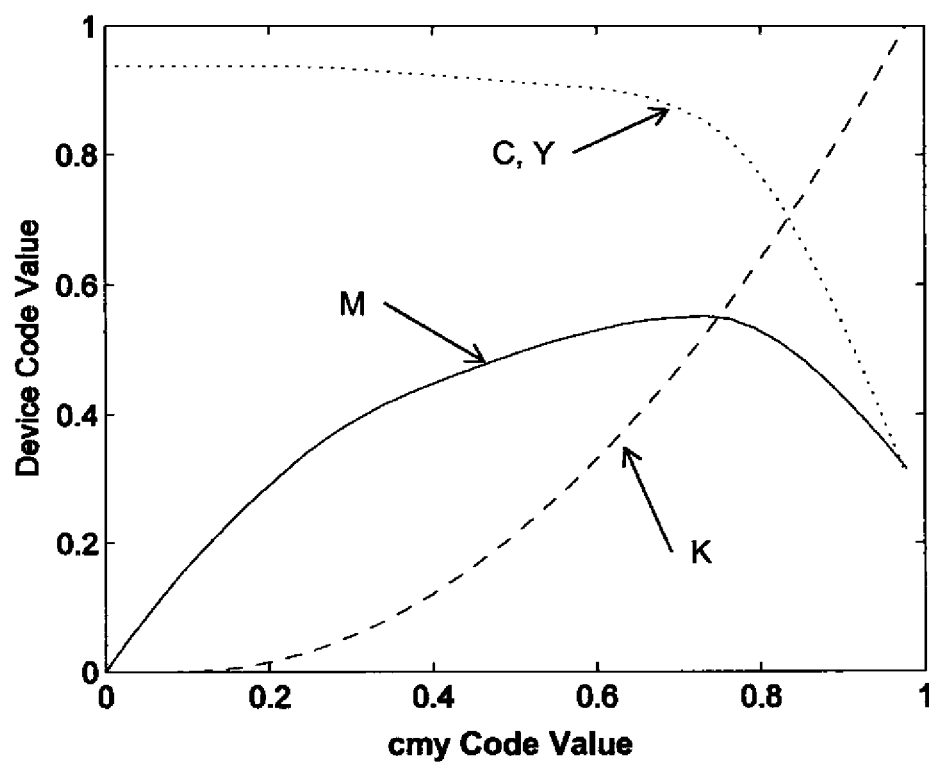
FIG. 11F is a diagram showing an example color mapping function for a black-to-green path.
Figure 11G:
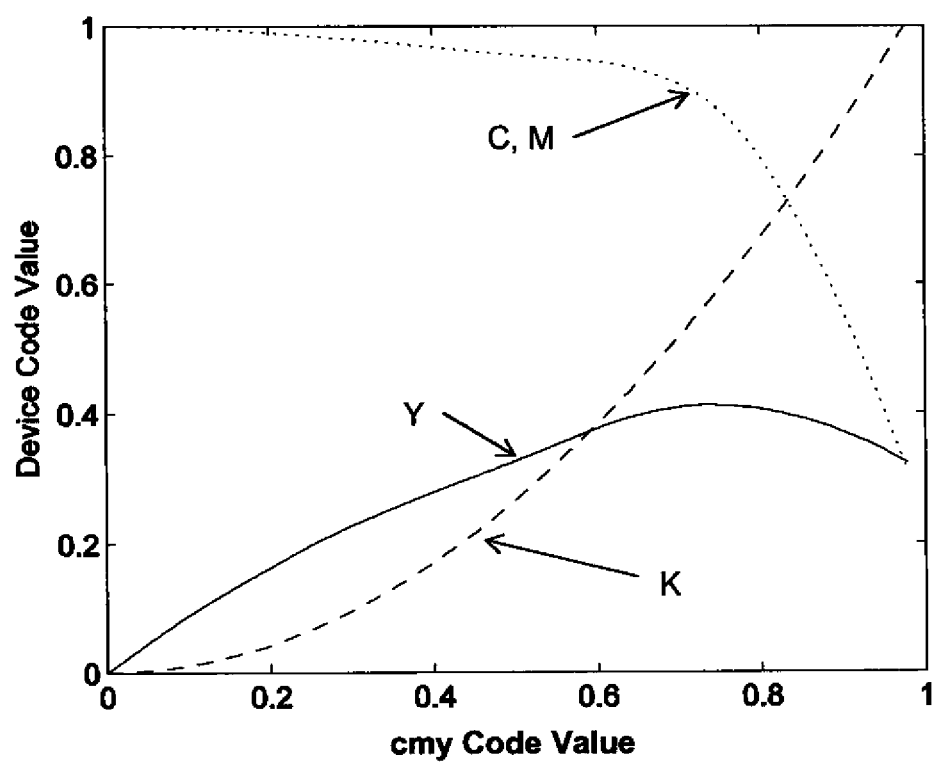
FIG. 11G is a diagram showing an example color mapping function for a black-to-blue path.

FIGS. 11E-G show color mappings for the black-to-secondary paths 65 (FIG. 10). Specifically, FIG. 11E shows a color mapping for the black-to-red path, FIG. 11F shows a color mapping for the black-to-green path, and FIG. 11G shows a color mapping for the black-to-blue path. In each case, the left edge of the graph corresponds to the secondary colors (red, green or blue) which are made using equal amounts of two of the colored inks, and the right edge of the graph corresponds to the black point. The general pattern in proceeding from the secondary to the black point is to first add the third colored ink until the ink level nears a maximum fluid limit, then the colored inks are tapered down while increasing the black ink level.

Color mappings are not shown for the white-to-primary paths 62 (FIG. 10) or the white-to-secondary paths 63 (FIG. 10) because these color mappings are simply linear functions where the levels of the appropriate colored inks are linearly increased. For example, the color mapping for the white-to-cyan path would start with no ink on one side and would linearly increase to the full cyan ink level. Similarly, the color mapping for the white-to-red path would start with no ink on one side and would linearly increase the magenta and yellow ink levels to the ink levels associated with the red primary on the left side of FIG. 11E.

Figure 12:
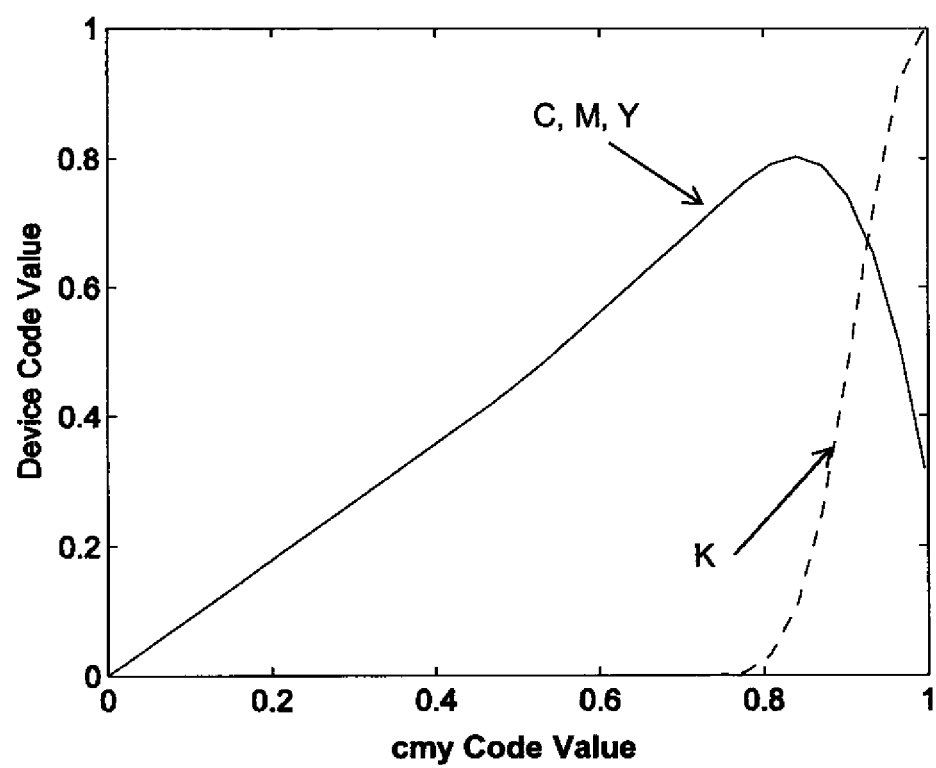
FIG. 12 is a diagram showing an example color mapping function for a neutral axis path determined using a printer noise constraint.

FIG. 12 shows a color mapping for the neutral axis path 67 corresponding to a second color transform 255 (FIG. 7) which is designed to satisfy the printer noise constraint 253 (FIG. 7). It can be seen that the neutral colors are mapped to printer CMYK code values that generally use much lower levels of black ink (K) than cyan, magenta and yellow inks (C, M, Y). The light black ink usage is desirable to reduce the sensitivity of the color transform to image noise visibility. In one embodiment, the second color transform 255 is formed using the color mapping for the neutral axis path 67 shown in FIG. 12, together with the same color mappings for the other paths that were used for the first color transform 252 (see FIGS. 11B-11G).

The define blending function step 256 (FIG. 7) is used to define a blending function 257 which is used by the blend color transforms step 258 to blend the first color transform 252 and the second color transform 255. There are many types of blending functions 257 known in the art that can be used to blend two color transforms. In a preferred embodiment, the first color transform 252 and the second color transform 255 are blended according to the following relationship:

$$N(c,m,y)=W(c,m,y)A(c,m,y)+[1-W(c,m,y)]B(c,m,y) \quad (1)$$

where c, m, and y are the input color code values of the first color transform 252 and the second color transform 255 (e.g., the parameter space code values 300), A(c,m,y) is the first color transform 252, B(c,m,y) is the second color transform 255, W(c,m,y) is the blending function 257 and N(c,m,y) is the blended color transform 259. U.S. Patent Application Publication 2009/0296153 to Wang et al., entitled "Methods, apparatus and systems for blending multiple GCRs" teaches a similar method for blending color transforms with different GCR characteristics, although the characteristics of the color transforms that they are blending are quite different than those of the present invention. In fact, the blended color transform formed by Wang et al. has characteristics that are incompatible with the printer variability constraint 250. Wang teaches using a "k-restricted" color transform that minimizes black ink usage near the neutral axis. This would have the result of increasing the sensitivity to color printer process variations for near-neutral colors rather than reducing them.

As described earlier, in a preferred embodiment the blending function 257 is used to compute weighting values for the first color transform 252 and the second color transform 255 where the weighting values for first color transform 252 are larger than the weighting values for the second color transform 255 in the first region of color space, and wherein the weighting values for second color transform 255 are larger than the weighting values for the first color transform 252 in the second region of color space.

Since the first region of color space preferably includes a near-neutral color region, the weighting values (W(c,m,y)) for first color transform 252 should be higher for near neutral colors than the weighting values (1−W(c,m,y)) for the second color transform 255. Likewise, the weighting values (1−W(c,m,y)) for second color transform 252 should be higher than the weighting values (W(c,m,y)) for the first color transform 252 in the second color region, which would include colors such as skin tones where image noise visibility is particularly important.

In a preferred embodiment, the blending function computes weighting values (i.e., W(c,m,y)) for the first color transform 252 that decrease with distance from a neutral axis, and weighting values (i.e., 1−W(c,m,y)) for the second color transform 255 that increase with distance from the neutral axis. One convenient way to characterize the distance from the neutral axis is simply to calculate the Euclidian distance in the input color space (e.g., the cmy parameter space). The neutral axis in this case will be the line where c=m=y. Methods for calculating a distance between a point and a line are well-known to those in the art. It can be shown that for the distance between a point in the parameter space (c, m, y) and the neutral axis line is given by:

$$R_{cmy} = \sqrt{(m-y)^2+(y-c)^2+(c-m)^2}/\sqrt{3} \quad (2)$$

where $R_{cmy}$ is the distance from the neutral axis line.

Figure 13A:
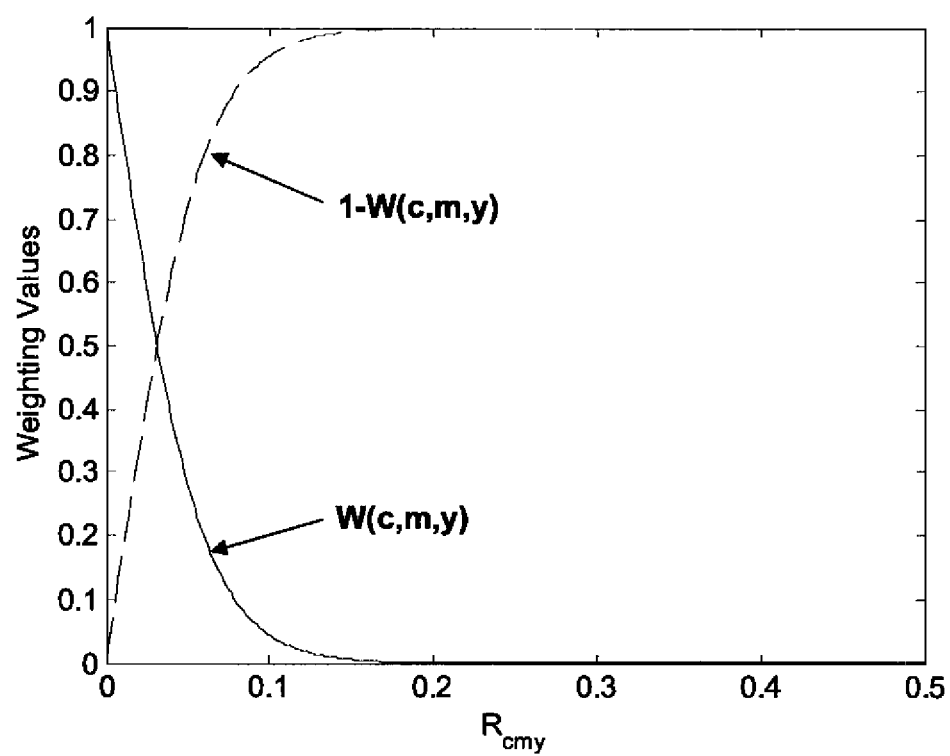
FIGS. 13A, 13B and 13C illustrate example blending functions.
Figure 13B:
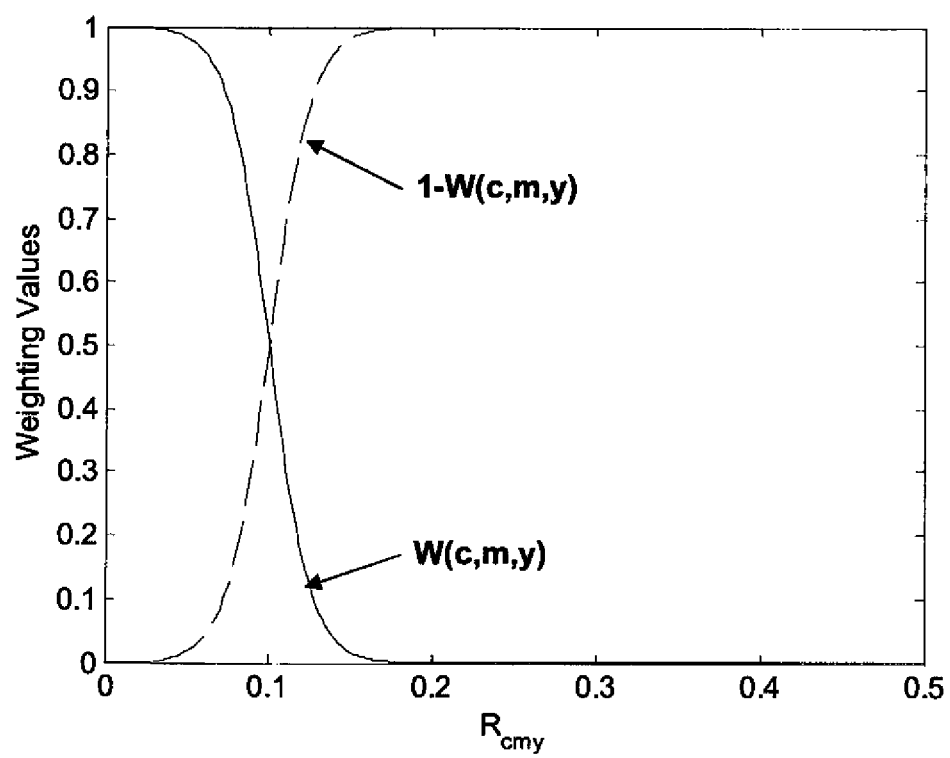
Figure 13C:
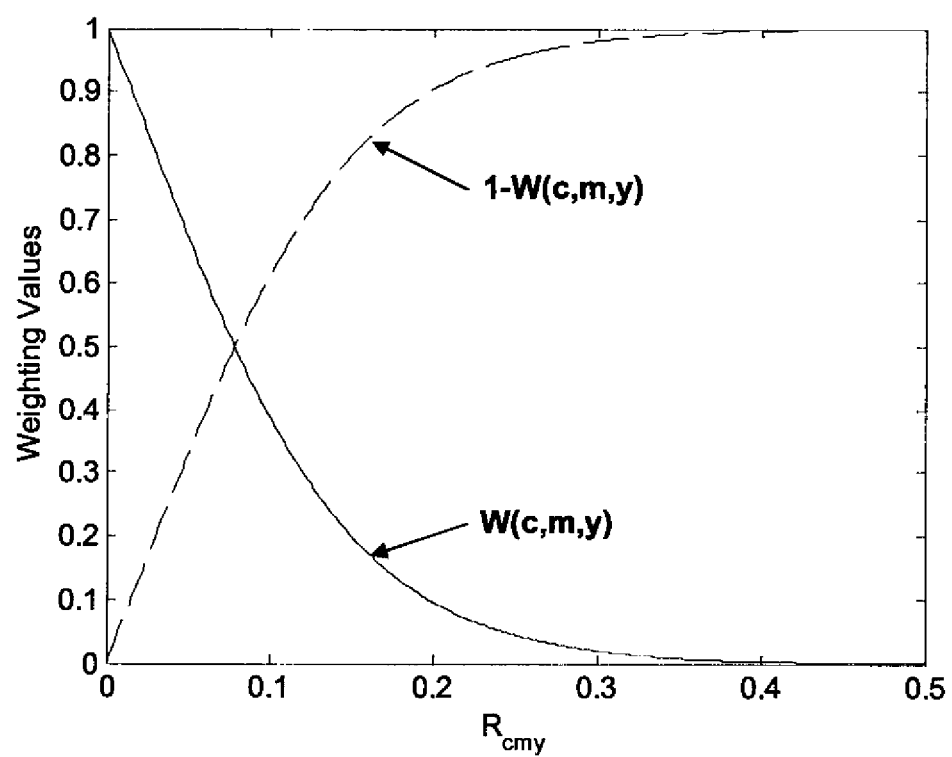

Examples of blending functions 257 (FIG. 7) that can be used in accordance with the present invention are shown in FIGS. 13A-13C. In each case, it can be seen that the weighting values (W(c,m,y)) for the first color transform 252 decrease with distance from the neutral axis, while the weighting values (1−W(c,m,y)) for the second color transform 255 increase with distance from the neutral axis. The weighting values shown in FIGS. 13A-13C were determined using the following parametric relationship:

$$W(c, m, y) = W(R_{cmy}) = \frac{1 - U(R_{cmy}, A, B)}{1 - U(0, A, B)} \quad (3)$$

where A is a rate parameter, B is a shape parameter, and $U(R_{cmy},A,B)$ is a sigmoid function given by:

$$U(R_{cmy}, A, B) = \frac{1}{1 + e^{-4(AR_{cmy}-B)}} \quad (4)$$

For the blending function of FIG. 13A, the weighting values change quickly with distance from the neutral axis, so that W(c,m,y) is essentially zero by the time $R_{cmy} \approx 0.1$. This corresponds to the case where the first region of color space is a narrow region around the neutral axis. The parameters used to compute the weighting values in this example were A=10 and B=0.1.

For the blending function of FIG. 13B, the weighting values fall off more slowly with distance from the neutral axis, so that W(c,m,y) stays near 1.0 for a range of $R_{cmy}$ values before starting to drop. In this case, the W(c,m,y) values do not reach zero until $R_{cmy} \approx 0.2$. The parameters used to compute the weighting values in this example were A=20 and B=2.

For the blending function of FIG. 13C, the weighting values change quickly with distance from the neutral axis, but do not fall off as quickly as those in FIG. 13A. The parameters used to compute the weighting values in this example were A=4.0 and B=0.01.

Figure 4:
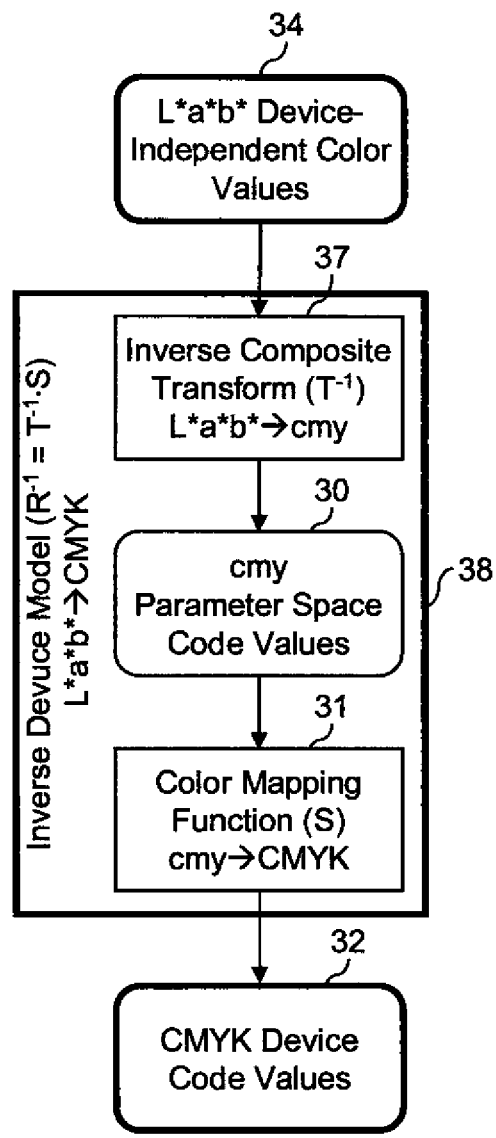
FIG. 4 is a flowchart showing the formation of an inverse device model according to the method of FIG. 3.

In other embodiments of the present invention, the distance from the neutral axis can be determined in other color spaces. For example, the input color can be converted to the CIELAB color space where the distance from the neutral axis will be given by the chroma value (C*). This is particularly convenient for the case where the input color space for the first color transform 252 and the second color transform 255 is CIELAB, such as the case where the two transforms that are being blended are inverse device models 38 (FIG. 4).

Figure 5:
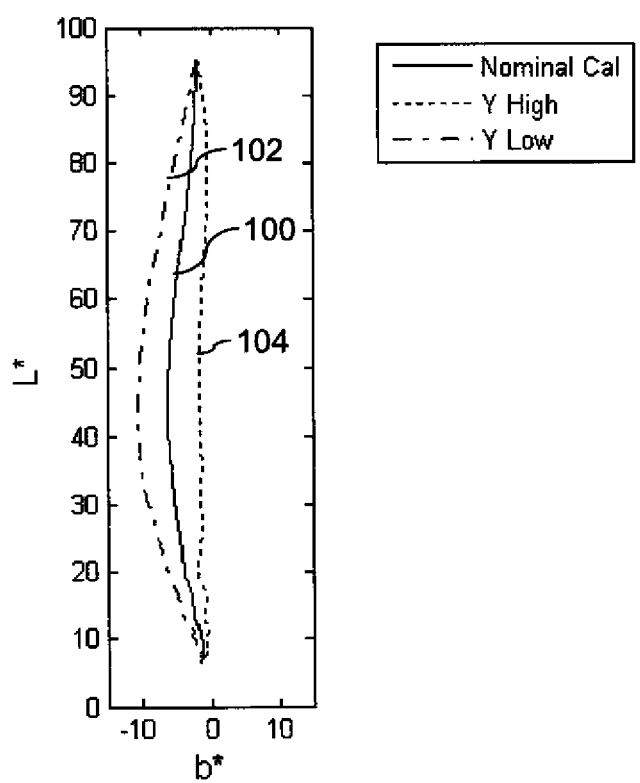
FIG. 5 is a graph illustrating the effect of color printer process variations on a neutral tone scale.
Figure 14A:
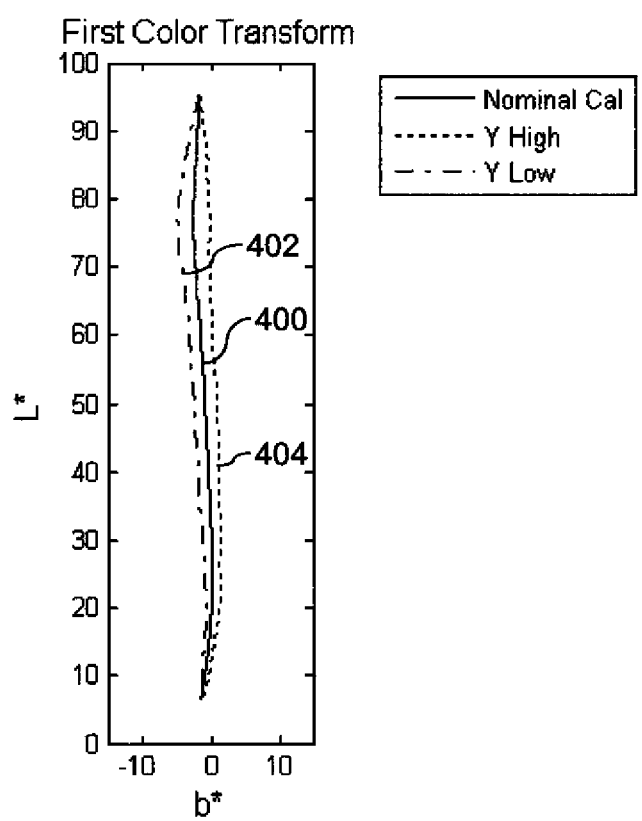
FIG. 14A is a graph illustrating the effect of color printer process variations on a neutral tone scale achieved using a first heavy black color transform.
Figure 14B:
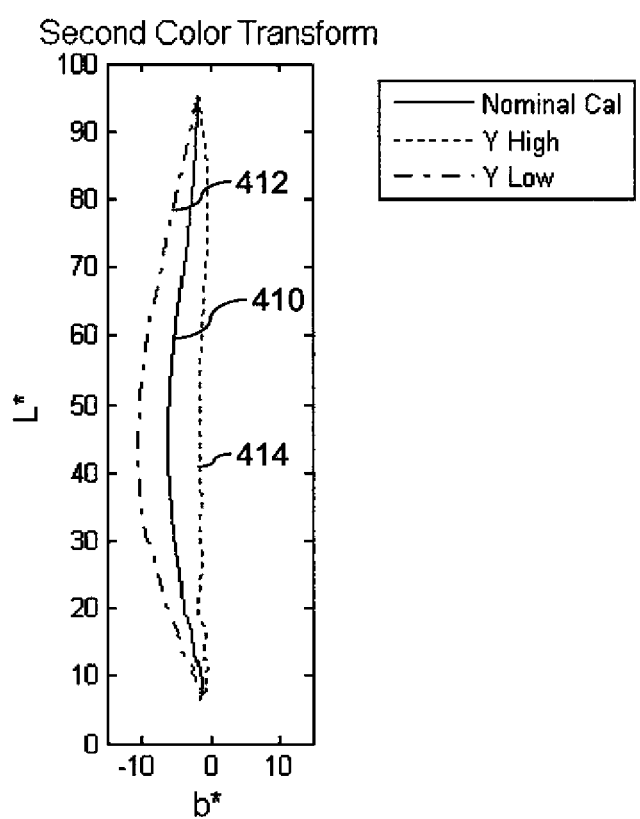
FIG. 14B is a graph illustrating the effect of color printer process variations on a neutral tone scale achieved using a second light black color transform.
Figure 14C:
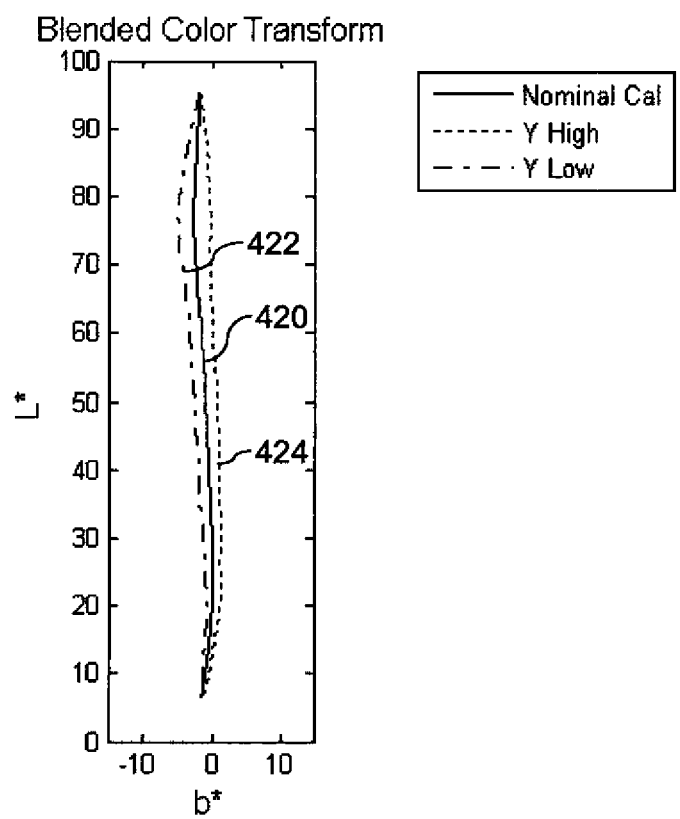
FIG. 14C is a graph illustrating the effect of color printer process variations on a neutral tone scale achieved using a blended color transform according to the method of the present invention.

FIGS. 14A-14C show L*-b* plots analogous to that given in FIG. 5, comparing the sensitivity to printer process variability between a first color transform 252 created by applying a printer variability constraint 250, a second color transform 255 created by applying a printer noise constraint 253, and a blended color transform 259 created according to the method of the present invention. Specifically, the first color transform 252 used to produce FIG. 14A was created using the color mapping functions shown in FIGS. 11A-G, the second color transform 255 used to produce FIG. 14B was created using the color mapping functions shown in FIGS. 11B-G and 12; and the blended color transform 259 used to produce FIG. 14C was created using the method of the present invention by blending the first color transform 252 and the second color transform 255 using the blending function 257 given in FIG. 13C.

The curves shown in FIGS. 14A-14C correspond to a similar level of printer process variations that was used to produce the curves in FIG. 5. Calibrated neutral scale curves 400, 410 and 420 correspond to neutral scales produced with equal CMY values for a nominally calibrated printer. Uncalibrated neutral scale curves 402, 412 and 422 show results that are produced when the yellow color channel is out of calibration and is producing less yellow than it was intended to produce. Uncalibrated neutral scale curves 404, 414 and 424 show results that are produced when the yellow color channel is out of calibration and is producing more yellow than it was intended to produce. Comparing FIG. 14A to FIG. 14C, it can be seen that the sensitivity to printer process variations for colors on the neutral axis is essentially identical between the blended color transform 259 of the present invention and the first color transform 252, which was optimized to have a reduced sensitivity to printer process variations. Comparing FIG. 14B to FIG. 14C, it can be seen that the sensitivity to printer process variations for colors on the neutral axis is greatly reduced by using the blended color transform 259 of the present invention relative to that of the second color transform 255 which was optimized to produce a reduced image noise visibility. Note that the fact that the calibrated neutral scale curves 400, 410 and 420 do not fall exactly on the a*=0, b*=0 neutral axis is intentional, and is a reflection of the fact that observers typically prefer a slightly bluish neutral in many applications.

Figure 15A:
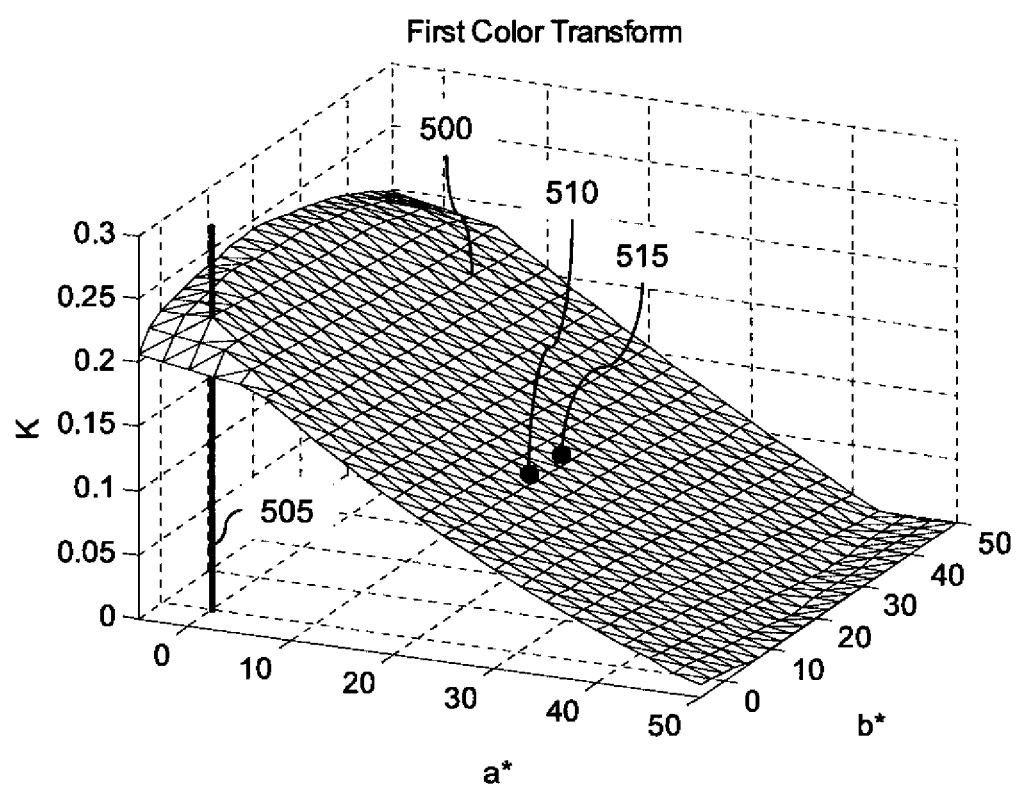
FIG. 15A is a graph showing black ink usage for a first heavy black color transform.
Figure 15B:
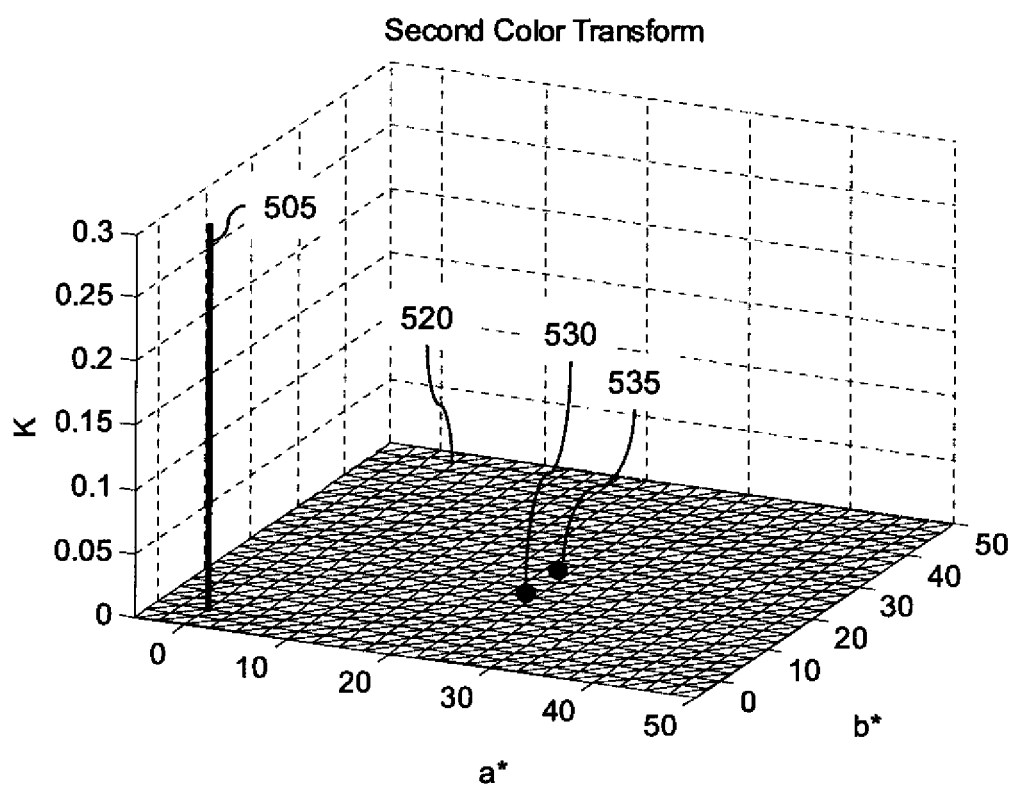
FIG. 15B is a graph showing black ink usage for a second light black color transform.
Figure 15C:
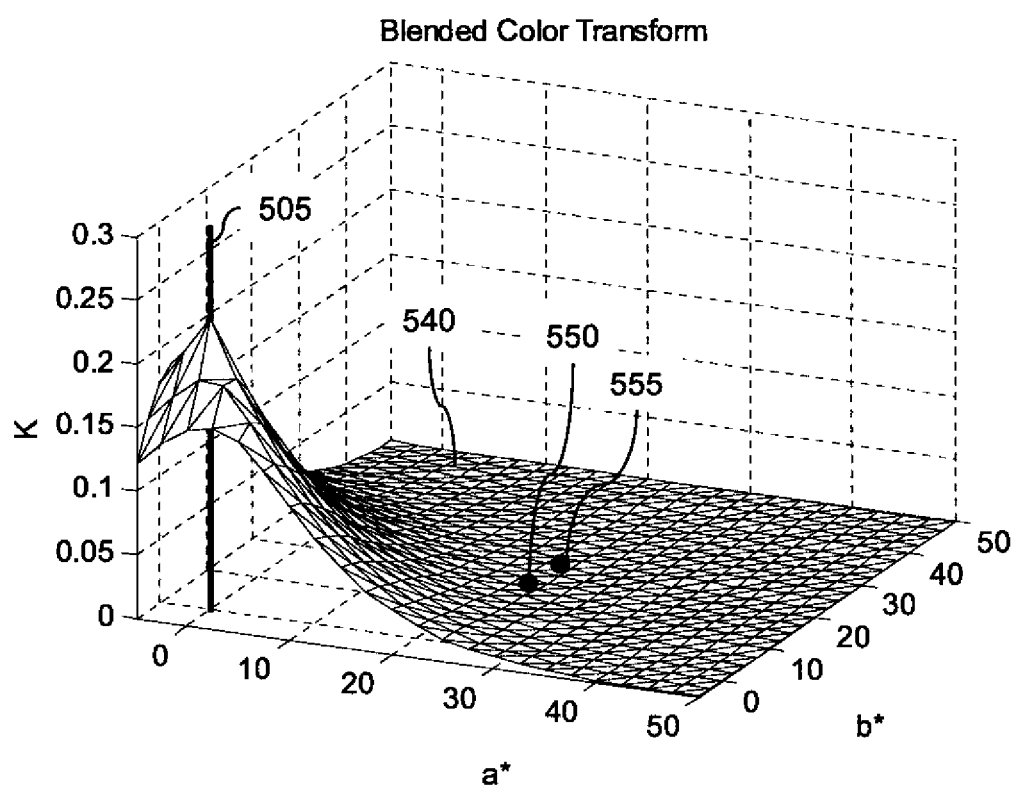
FIG. 15C is a graph showing black ink usage for a blended color transform according to the method of the present invention.

FIGS. 15A, 15B and 15C compare the black ink usage as a function of a* and b* for input colors having an L*=70 for the first color transform 252, the second color transform 255 and the blended color transform 259, respectively, described above. FIG. 15A shows the first color transform black ink usage 500. It can be seen that a high level of black ink is used near the neutral axis 505. As the chroma of the input color increases, the level of black ink usage decreases. Two skin tone points 510 and 515 are shown corresponding to different skin tone colors. It can be seen that a moderate amount of black ink is used to produce these skin tone colors. As a result, many observers would find the image noise visibility for these colors objectionable.

FIG. 15B shows the second color transform black ink usage 520. It can be seen that no black ink is used to produce any of the colors at this lightness value. In particular, it can be seen that no black ink is used for input colors corresponding to the neutral axis 505 or skin tone points 530 and 535. As a result, digital images printed using the second color transform 255 would have a reduced noise visibility relative to images printed using the first color transform 252 shown in FIG. 15A. However, as was discussed earlier, the second color transform will have a higher sensitivity to color printer process variations, particularly for colors near the neutral axis.

FIG. 15C shows the blended color transform black ink usage 540. It can be seen that near the neutral axis 505, the black ink usage is similar to that of the first color transform black ink usage 500 shown in FIG. 15A. However, at the skin tone points 550 and 555, the black ink usage is negligible and is similar to the second color transform black ink usage 520 shown in FIG. 15B. As a result, images printed using the blended color transform 259 would have a reduced sensitivity to printer process variations in a first region of color space that includes the neutral axis, and would have a reduced image noise visibility in a second region of color space that includes the skin tone colors.

Tables 1-3 show ink usage and image graininess values determined for three different skin tone patches using the first color transform 252, the second color transform 255 and the blended color transform 259. The ink usage for the CMYK color channels is specified in terms of percent coverage. Print granularity index values are also shown for each sample. The print granularity index is a measure of the image graininess (i.e., the image noise visibility), and is determined by integrating a visually-weighted noise power spectrum.

To calculate the print granularity index values, the test patches were printed and then scanned on an RGB scanner that was calibrated to be linear with visual density. A virtual "slit" was used to average the data in blocks, to provide a one-dimensional noise trace. A noise power spectrum was then calculated from averaged slit data. The noise power spectrum was then weighted by a visual frequency response and integrated. The print granularity index can be related to a subjective perception of image grain. A JND for this print granularity index is about 5 units.

It can be seen that for the Caucasian and Asian skin tone patches, the black ink usage and the resulting skin tone graininess for the blended color transform 259 essentially match those of the second color transform 255 having the light black ink usage, and is advantaged relative to the results obtained using the first color transform 252 having the heavy black usage. For the African skin tone patch, the black ink usage for the blended color transform 259 goes down relative to that for the first color transform 252, but the cyan, magenta and yellow ink usage goes up significantly. The net result is that the graininess is more similar to that of the first color transform 252, but is still somewhat advantaged.

Similarly, Table 4 shows ink usage and print granularity index values for a neutral patch having an L*=70. It can be seen that the black ink usage and the resulting neutral patch print granularity index for the blended color transform 259 essentially match those of the first color transform 252 having the heavy black ink usage. The blended color transform 259 uses substantially more black ink and less CMY ink than the second color transform 255, and would therefore be advantaged relative to the sensitivity to color printer process variations. While the corresponding graininess can be seen to be higher, observers do not find the graininess to be as objectionable as the sensitivity to color printer process variations.

TABLE 1

Caucasian skin tone ink usage and graininess

| Color Transform | C | M | Y | K | Print Granularity Index |
|---|---|---|---|---|---|
| First Color Transform (Heavy Black) | 6% | 39% | 35% | 4% | 60.18 |
| Second Color Transform (Light Black) | 10% | 40% | 37% | 0% | 42.53 |
| Blended Color Transform | 10% | 40% | 37% | 0% | 43.77 |

TABLE 2

Asian skin tone ink usage and graininess

| Color Transform | C | M | Y | K | Print Granularity Index |
|---|---|---|---|---|---|
| First Color Transform (Heavy Black) | 6% | 40% | 42% | 3% | 61.78 |
| Second Color Transform (Light Black) | 9% | 40% | 43% | 0% | 43.52 |
| Blended Color Transform | 9% | 40% | 43% | 0% | 44.16 |

TABLE 3

African skin tone ink usage and graininess

| Color Transform | C | M | Y | K | Print Granularity Index |
|---|---|---|---|---|---|
| First Color Transform (Heavy Black) | 37% | 62% | 58% | 33% | 91.39 |
| Second Color Transform (Light Black) | 56% | 75% | 73% | 0% | 81.39 |
| Blended Color Transform | 52% | 71% | 69% | 11% | 89.45 |

TABLE 4

L* = 70 neutral point ink usage and graininess

| Color Transform | C | M | Y | K | Print Granularity Index |
|---|---|---|---|---|---|
| First Color Transform (Heavy Black) | 19% | 18% | 16% | 19% | 62.69 |
| Second Color Transform (Light Black) | 29% | 29% | 28% | 0% | 44.02 |
| Blended Color Transform | 18% | 18% | 16% | 19% | 63.18 |

It has been found that for many applications, images printed using the blended color transform 259 are judged to be preferable to images printed with either the first color transform 252 or the second color transform 255, particularly for color printers which exhibit a significant degree of process variability.

While many common color printers today utilize CMYK colorants, there are an increasing number of color printers that utilize additional colorants as well. Some color printers utilize lighter versions of one or more of the CMYK colorants in order to reduce image noise. For example, many ink jet printers add light cyan and light magenta colorants to the CMYK colorant set. Other color printers add a light black (gray) colorant. Light yellow colorants could also be used, although there is typically less value for using light yellow colorants since yellow inks generally have low image noise visibility.

It is also becoming increasingly common for color printers to add additional chromatic colorants such as red, blue, green or orange. The use of these colorants is intended to extend the color gamut of the color printing device.

The method of the present invention can also be used with any of these extra colorant configurations. In this case, the first color transform 252 and the second color transform 255 will map the input color values to colorant control signals for the full set of colorants, rather than the CMYK colorant set assumed in the examples discussed earlier. In some embodiments, the first color transform 252 and the second color transform 255 can be created by defining color mappings for the set of paths in given in FIG. 10 which define the usage for each of the colorants along the paths.

For example, for a color printing device that uses light cyan and light magenta colorants in addition to the CMYK colorants, the color mappings will have 6 output channels corresponding to the colorant control values for cyan, magenta, yellow, black, light cyan and light magenta. Likewise, this same set of 6 colorant control values will be the inputs to the forward device model 315 (FIG. 8A) that is used to determine the blended composite transform 325.

Similarly, the method of the present invention can also be applied for a color printing device that uses one or more extended-gamut colorants in addition to CMYK. For example, consider a color printing device that uses red and blue colorants, as well as the conventional CMYK colorants. The color mappings for the set of paths can be used to control how the extra gamut colorants are used in different parts of color space. For example, the yellow-to-red path can be used to control how much magenta and red colorants would be used throughout that transition. Maximizing the color gamut would be an important factor in an optimization process for determining the optimal path, but other factors would also include image noise and total colorant amount. As more colorants are added, there may be a large benefit to adding additional paths to the set of paths, beyond those shown in FIG. 10. For example, it may be desirable to add additional paths connecting the white and black points to intermediate colors on the transition between yellow and red to provide more control of the colorant usage through that portion of color space.

Although all of the examples that have been discussed have included CMYK colorants, it will be obvious to one skilled in the art that the method of the present invention can also be applied to sets of colorants that do not include any or all of the CMYK colorants. For example, it could be applied for a color printing device using cyan, magenta, yellow, red and blue.

There is also no limitation that the method be applied to hard-copy color printing devices. It could also be applied for soft-copy color display devices, such as CRT, LCD or OLED displays, having four or more additive primaries. For example, it could be used for a softcopy display using red, green, blue and white primaries. It could also be used for a softcopy display using four or more chromatic primaries.

The invention has been described in detail with particular reference to certain preferred embodiments thereof, but it will be understood that variations and modifications can be effected within the spirit and scope of the invention.

PARTS LIST

10 RGB device code values
12 Forward device model

14 Device-independent color values
16 Build three-channel inverse device model step
18 Inverse device model
20 CMYK device code values
22 Forward device model
24 Device-independent color values
26 Build four-channel inverse device model step
28 Inverse device model
30 Parameter space code values
31 Color mapping function
32 CMYK device code values
33 Forward device model
34 Device-independent color values
35 Composite transform
36 Build inverse composite transform step
37 Inverse composite transform
38 Inverse device model
62 White-to-primary paths
63 White-to-secondary paths
64 Black-to-primary paths
65 Black-to-secondary paths
66 Primary-to-secondary paths
67 Neutral axis path
100 Calibrated neutral scale curve
102 Uncalibrated neutral scale curve
104 Uncalibrated neutral scale curve
110 Data processing system
120 Peripheral system
130 User interface system
140 Data storage system
250 Printer variability constraint
251 Form first color transform step
252 First color transform
253 Printer noise constraint
254 Form second color transform step
255 Second color transform
256 Define blending function step
257 Blending function
258 Blend color transforms step
259 Blended color transform
300 Parameter space code values
305 Blended color mapping function
310 CMYK device code values
315 Forward device model
320 Device-independent color values
325 Blended composite transform
330 Blended inverse composite transform
335 Blended inverse device model
340 Input device code values
345 Input device model
350 Blended color managed color transform
400 Calibrated neutral scale curve
402 Uncalibrated neutral scale curve
404 Uncalibrated neutral scale curve
500 First color transform black ink usage
505 Neutral axis
510 Skin tone point
515 Skin tone point
520 Second color transform black ink usage
530 Skin tone point
535 Skin tone point
540 Blended color transform black ink usage
550 Skin tone point
555 Skin tone point

The invention claimed is:

1. A method for determining a blended color transform for use in producing printed colors on a color printer having at least four device color channels, wherein the blended color transform transforms colors from an input color space to an output color space, comprising:

forming a first color transform from the input color space to the output color space;

forming a second color transform from the input color space to the output color space, wherein the first color transform produces printed colors that have a reduced sensitivity to color printer process variations relative to the second color transform in at least a first region of color space that includes a near-neutral color region, and wherein the second color transform produces printed colors that have a reduced image noise visibility relative to the first color transform in at least a second region of color space;

defining a blending function which computes weighting values for the first and second color transforms as a function of input color values in the input color space, wherein the weighting values for first color transform are larger than the weighting values for the second color transform in the first region of color space, and wherein the weighting values for second color transform are larger than the weighting values for the first color transform in the second region of color space; and using a processor to determine the blended color transform by blending the first color transform and the second color transform, responsive to the blending function.

2. The method of claim 1 wherein the second region of color space includes a skin tone color region.

3. The method of claim 1 wherein the second region of color space includes a saturated color region.

4. The method of claim 3 wherein the saturated color region includes a set of primary and secondary colors in the input color space.

5. The method of claim 1 wherein the output color channels correspond to colorant control channels for the color printer.

6. The method of claim 1 wherein the output color channels include a black color channel, and wherein the first color transform produces output color values having higher levels of black relative to the second color transform for input color values within the first region of color space.

7. The method of claim 1 wherein the output color channels include a black color channel, and wherein the second color transform produces output color values having lower levels of black relative to the first color transform for input color values within the second region of color region.

8. The method of claim 1 wherein the blending function computes weighting values for the first color transform that decrease with distance from a neutral axis, and wherein the blending function computes weighting values for the second color transform that increase with distance from the neutral axis.

9. The method of claim 1 wherein the blended color transform is determined by blending the first color transform and the second color transform using the relationship:

$$N(c,m,y) = W(c,m,y)A(c,m,y) + [1-W(c,m,y)]B(c,m,y)$$

where c, m, and y are the input color channels of the input color space, $A(c,m,y)$ is the first color transform, $B(c,m,y)$ is the second color transform, $W(c,m,y)$ is the blending function and $N(c,m,y)$ is the blended color transform.

10. The method of claim 9 wherein the blending function is given by:

$$W(c, m, y) = W(R_{cmy}) = \frac{1 - U(R_{cmy}, A, B)}{1 - U(0, A, B)}$$

where c, m, and y are the input color channels of the input color space, A is a rate parameter, B is a shape parameter, $R_{cmy}$ is the distance from the neutral axis line in the input color space given by:

$$R_{cmy} = \sqrt{(m-y)^2 + (y-c)^2 + (c-m)^2}/\sqrt{3}$$

and $U(R_{cmy}, A, B)$ is a sigmoid function given by:

$$U(R_{cmy}, A, B) = \frac{1}{1 + e^{-A(AR_{cmy} - B)}}.$$

11. The method of claim 1 wherein the blended color transform is a three-dimensional look-up table having three input channels addressed by the input color channels.

12. The method of claim 1 wherein the reduced sensitivity to color printer process variations is a reduced sensitivity to color balance variations for near-neutral input colors induced by variations in a response characteristic of the color printer.

13. The method of claim 1 wherein the first color transform produces printed colors that have a reduced sensitivity to color inconstancy under a plurality of viewing illuminants relative to the second color transform in at least the first region of color space.

14. The method of claim 1 wherein the input color space for the blended color transform is a three-channel parameter space and the output color space for the blended color transform is a device code value space having at least four color channels corresponding to the device color channels of the color printer.

15. The method of claim 14 further including using the blended color to determine an inverse device color transform by:
    determining a device color model for transforming output color values in the output color space to corresponding device-independent color values in a device-independent color space;
    determining a composite color model for transforming input color values to device-independent color values by combining the blended color transform and the device color model;
    building an inverse composite color model for transforming device-independent color values to input color values by inverting the composite color model; and
    determining the inverse device color transform by combining at least the inverse composite color model and the blended color transform.

16. The method of claim 15 further including combining the inverse device color transform with an input device color model to determine a color-managed color transform adapted to transform device-dependent input color values in a device-dependent input color space to output color values in the output color space.

17. The method of claim 16 wherein the device-dependent input color space is a video RGB color space.

18. The method of claim 14 further including using the blended color transform to determine a color-managed color transform by:
    defining a set of input test patch color values in the input color space;
    transforming the input test patch color values using the blended color transform to determine output test patch color values in the output color space;
    determining device-independent color values in a device-independent color space corresponding to the output test patch color values;
    building a forward color model for transforming input color values to device-independent color values responsive to the input test patch color values and the measured device-independent color values; and
    building an inverse color model for transforming device-independent color values to input color values by inverting the forward color model;
    combining the inverse color model and the blended color transform to determine the color-managed color transform.

19. The method of claim 18 wherein the step of determining device-independent color values includes:
    printing test patches having the output test patch color values on the color printer; and
    measuring the printed test patches to determine device-independent color values.

20. The method of claim 18 wherein the step of determining device-independent color values includes using a model of the color printer to determine device-independent color values corresponding to the output test patch color values.

21. The method of claim 1 wherein the input color space for the blended color transform is a device-independent color space and the output color space for the blended color transform is a device code value space having at least four color channels corresponding to the device color channels of the color printer.

22. The method of claim 1 wherein the color printer has cyan, magenta, yellow and black color channels.

23. The method of claim 1 wherein the color printer has cyan, magenta and yellow color channels and at least one additional color channel corresponding to a light colorant.

24. The method of claim 1 wherein the color printer has cyan, magenta and yellow color channels and at least one additional color channel corresponding to a red, green, blue or orange colorant.

* * * * *